(12) United States Patent
Gulati et al.

(10) Patent No.: US 11,101,918 B2
(45) Date of Patent: Aug. 24, 2021

(54) TECHNIQUES FOR COMPENSATING FOR DOPPLER EFFECTS IN COMMUNICATIONS

(71) Applicant: QUALCOMM Incorporated, San Diego, CA (US)

(72) Inventors: Kapil Gulati, Dover, DE (US); Shailesh Patil, Raritan, NJ (US); Junyi Li, Chester, NJ (US); Sudhir Kumar Baghel, Hillsborough, NJ (US); Zhibin Wu, Bedminster, NJ (US); Libin Jiang, Bridgewater, NJ (US); Tien Viet Nguyen, Bridgewater, NJ (US); Georgios Tsirtsis, London (GB); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 15/585,537

(22) Filed: May 3, 2017

(65) Prior Publication Data

US 2018/0083730 A1    Mar. 22, 2018

Related U.S. Application Data

(60) Provisional application No. 62/395,983, filed on Sep. 16, 2016.

(51) Int. Cl.
*H04L 1/00* (2006.01)
*H04W 56/00* (2009.01)
(Continued)

(52) U.S. Cl.
CPC ......... *H04L 1/0019* (2013.01); *H04B 7/0617* (2013.01); *H04L 1/001* (2013.01);
(Continued)

(58) Field of Classification Search
CPC ... H04L 1/0019; H04L 1/0009; H04L 1/0003; H04L 1/007; H04L 5/0048; H04L 1/0023;
(Continued)

(56) References Cited

U.S. PATENT DOCUMENTS 8,599,956 B1 * 12/2013 Mitchell ........... H04W 56/0035
375/285
9,451,417 B2   9/2016 Abraham et al.
(Continued)

FOREIGN PATENT DOCUMENTS

| CN | 1875593 A | 12/2006 |
|---|---|---|
| CN | 101039162 A | 9/2007 |

(Continued)

OTHER PUBLICATIONS

Intel Corporation: "Scheduling Assignment for Sidelink V2V Communication", 3GPP Draft; R1-164141 Intel-V2V Sci, 3rd Generation Partnership Project (3GPP), Mobile Competence Centre: 650, Route Des Lucioles: F-06921 Sophia-Antipolis Cedex; France, vol. RAN WG1, No. Nanjing, China; May 14, 2016, XP051096573, Retrieved from the Internet: URL:http://www.3gpp.org/ftp/tsg_ran/WG1_RL1/TSGR1_85/Docs/ [retrieved on May 14, 2016], 8 pages.

(Continued)

*Primary Examiner* — Harry H Kim
(74) *Attorney, Agent, or Firm* — Holland & Hart LLP

(57) ABSTRACT

Techniques are described for wireless communication at a wireless device. One method includes transmitting, during a TTI, a first message using a first MCS; and transmitting, during the TTI, a second message using a second MCS. The first message includes indications of a location, a heading, and a speed of the wireless device, and the second MCS is higher than the first MCS. Another method includes decoding a first message received during a TTI; performing a Doppler effect compensation for a second message based at (Continued)

least in part on the first message; and decoding the second message based at least in part on the Doppler effect compensation. The second message is also received during the TTI. The first message is decoded in accordance with a first MCS, and the second message is decoded in accordance with a second MCS, with the second MCS being higher than the first MCS.

24 Claims, 17 Drawing Sheets

(51) Int. Cl.
*H04B 7/06* (2006.01)
*H04W 16/28* (2009.01)
*H04W 64/00* (2009.01)
*H04W 72/04* (2009.01)
*H04L 5/00* (2006.01)

(52) U.S. Cl.
CPC .......... *H04L 1/0004* (2013.01); *H04L 1/0005* (2013.01); *H04L 1/007* (2013.01); *H04L 1/0011* (2013.01); *H04L 1/0015* (2013.01); *H04L 1/0023* (2013.01); *H04W 16/28* (2013.01); *H04W 56/0035* (2013.01); *H04W 64/006* (2013.01); *H04W 72/0446* (2013.01); *H04L 5/0048* (2013.01)

(58) Field of Classification Search
CPC .. H04B 7/0617; H04W 4/40; H04W 56/0035; H04W 64/006; H04W 72/0446; H04W 16/28
See application file for complete search history.

(56) References Cited

U.S. PATENT DOCUMENTS

| | | | | |
|---|---|---|---|---|
| 9,735,940 | B1* | 8/2017 | Bakr | H04B 7/0408 |
| 2002/0054621 | A1* | 5/2002 | Kyeong | H04B 7/0897 |
| | | | | 375/147 |
| 2003/0123598 | A1* | 7/2003 | Gollamudi | H04L 1/203 |
| | | | | 375/377 |
| 2005/0221876 | A1* | 10/2005 | Van Bosch | H04L 51/00 |
| | | | | 455/575.9 |
| 2005/0239435 | A1* | 10/2005 | Ikeda | H04L 47/10 |
| | | | | 455/403 |
| 2007/0097981 | A1* | 5/2007 | Papasakellariou | H04L 5/0055 |
| | | | | 370/394 |
| 2008/0153425 | A1* | 6/2008 | Heo | H04L 1/001 |
| | | | | 455/68 |
| 2008/0312836 | A1* | 12/2008 | Tillotson | G01K 11/00 |
| | | | | 702/3 |
| 2009/0052512 | A1 | 2/2009 | Kim et al. | |
| 2010/0260154 | A1* | 10/2010 | Frank | G01S 5/10 |
| | | | | 370/336 |
| 2010/0317293 | A1* | 12/2010 | Yokoyama | H04W 56/0035 |
| | | | | 455/63.1 |
| 2013/0044701 | A1* | 2/2013 | Koorapaty | H04L 5/0048 |
| | | | | 370/329 |
| 2015/0094100 | A1* | 4/2015 | Opshaug | G01S 5/0242 |
| | | | | 455/456.5 |
| 2015/0126235 | A1* | 5/2015 | Cho | H04W 68/005 |
| | | | | 455/458 |
| 2017/0164350 | A1* | 6/2017 | Sun | H04L 5/0007 |
| 2017/0373890 | A1* | 12/2017 | Fertonani | H04L 27/0002 |
| 2019/0165894 | A1* | 5/2019 | Choi | H04B 17/24 |
| 2019/0182096 | A1* | 6/2019 | Bin Sediq | H04L 1/0061 |

FOREIGN PATENT DOCUMENTS

| | | |
|---|---|---|
| CN | 104981022 A | 10/2015 |
| WO | WO-2015080840 | 6/2015 |

OTHER PUBLICATIONS

Intel Corporation: "On DMRS Physical Structure Enhancements for PSCCH and PSSCH", 3GPP Draft; R1-164134 Intel-V2V DMRS, 3rd Generation Partnership Project (3GPP), Mobile Competence Centre; 650, Route Des Lucioles; F-06921 Sophia-Antipolis Cedex.; France, vol. RAN WG1, No. Nanjing, China; May 23, 2016-May 27, 2016 May 14, 2016, XP051096580, Retrieved from the Internet: URL:http://www.3gpp.org/ftp/tsg_ran/WG1_RL1/TSGR1_85/Docs/ [retrieved on May 14, 2016], 11 pages.

Intel Corporation: "Remaining Details of PSCCH and PSSCH Physical Layer Structure for V2V Communication", 3GPP Draft; R1-166509 Intel-V2V PSSCH and PSCCH, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 21, 2016, XP051125405, Retrieved from the Internet: URL:http://www.3gpp.org/ftp/Meetings_3GPP_SYNC/RAN1/Docs/ [retrieved on Aug. 21, 2016], 9 pages.

International Search Report and Written Opinion—PCT/US2017/045617—ISA/EPO—dated Nov. 21, 2017.

Qualcomm Technologies: "Leading the World to 5G: Cellular Vehicle-to-Everything (C-V2X)Technologies", Jun. 1, 2016, XP055420307, Retrieved from the Internet: URL:https://www.researchgate.net/file.PostFileLoader.html?id=58cd3fb7eeae3955586948cb&assetKey=AS:473263416582144@1489846199042 [retrieved on Oct. 31, 2017], 39 pages.

Beijing Xinwei Telecom Techn: "Link Performance of OMRS Enhancement for V2V PSCCH/PSSCH", 3GPP Draft, 3GPP TSG RAN WG1 Meeting #84bis, R1-163158, vol. RAN WG1, No. Busan, Korea, Apr. 1, 2016, 3 Pages.

ZTE: "RS Sequence of PSCCH/PSSCH",3GPP Draft, 3GPP TSG-RAN WG1 Meeting #86, R1-166976, Gothenburg, Sweden, Aug. 22-26, 2016, vol. RAN WG1, No. 6 Pages.

* cited by examiner

TECHNIQUES FOR COMPENSATING FOR DOPPLER EFFECTS IN COMMUNICATIONS

CROSS REFERENCES

The present Application for Patent claims priority to U.S. Provisional Patent Application No. 62/395,983 by Gulati, et al., entitled "Techniques for Compensating for Doppler Effects in Communications," filed Sep. 16, 2016, assigned to the assignee hereof.

BACKGROUND

Field of the Disclosure

The present disclosure, for example, relates to wireless communication systems, and more particularly to techniques compensating for Doppler effects in communications.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of network access devices (e.g., base stations or access points), each simultaneously supporting communication for multiple communication devices, otherwise known as user equipments (UEs). A network access device may communicate with UEs on downlink channels (e.g., for transmissions from a network access device to a UE) and uplink channels (e.g., for transmissions from a UE to a network access device). UEs or other wireless devices may also communicate with each other directly, using various forms of device-to-device (D2D) communication.

SUMMARY

The present disclosure describes techniques for compensating for Doppler effects in communications. The techniques include transmitting, within a transmission time interval (TTI), a first message and a second message. In some examples, the first message may include a control transmission, and the second message may include a data transmission. In other examples, the first message may include a first part of a data transmission, and the second message may include a second part of the data transmission. In either example, the first message may be transmitted using a first modulation and coding scheme (MCS), and the second message may be transmitted using a second MCS. In some cases, the second MCS may be higher than the first MCS. Transmitting the first message at a lower MCS may enable a receiving device to estimate a Doppler effect based on the first message. In some cases, the receiving device may compensate for the Doppler effect when receiving the second message in accordance with the second MCS.

In one example, a method for wireless communication at a wireless device is described. The method may include transmitting, during a TTI, a first message using a first MCS. The method may include transmitting, during the TTI, a second message using a second MCS. The first message may include indications of a location, a heading, and a speed of the wireless device. In one example, the second MCS may be higher than the first MCS.

In some examples, the method may include identifying a high Doppler effect condition, and transmitting the first message using the first MCS based at least in part on identifying the high Doppler effect condition.

In some examples of the method, the first message may include a control transmission and the second message may include a data transmission. In some examples, the first message may further include an indication of beamforming vectors of the wireless device.

In some examples of the method, the first message may be transmitted using a first density of resource element (RE) carrying reference symbols, the first message may include an indication of a second density of RE carrying reference symbols of the second message, and the second density of RE carrying reference symbols may be greater than the first density of RE carrying reference symbols. In some examples, the first message may include an indication of locations of the density of RE carrying reference symbols of the second message.

In one example, an apparatus for wireless communication at a wireless device is described. The apparatus may include means for transmitting, during a TTI, a first message using a first MCS; and means for transmitting, during the TTI, a second message using a second MCS. The first message may include indications of a location, a heading, and a speed of the wireless device. In some cases, the second MCS may be higher than the first MCS.

In some examples, the apparatus may include means for identifying a high Doppler effect condition, and means for transmitting the first message using the first MCS based at least in part on identifying the high Doppler effect condition.

In some examples of the apparatus, the first message may include a control transmission and the second message may include a data transmission. In some examples, the first message may further include an indication of beamforming vectors of the wireless device.

In some examples of the apparatus, the first message may be transmitted using a first density of RE carrying reference symbols, the first message may include an indication of a second density of RE carrying reference symbols of the second message, and the second density of RE carrying reference symbols may be greater than the first density of RE carrying reference symbols. In some examples, the first message may include an indication of locations of the density of RE carrying reference symbols of the second message.

In one example, another method for wireless communication at a wireless device is described. The method may include decoding a first message received during a TTI; performing a Doppler effect compensation for a second message based at least in part on the first message; and decoding the second message based at least in part on the Doppler effect compensation. The second message may also be received during the TTI. The first message may be decoded in accordance with a first MCS, and the second message may be decoded in accordance with a second MCS. In some examples, the second MCS may be higher than the first MCS. In some examples of the method, the first message may include a control transmission and the second message may include a data transmission.

In some examples of the method, the first message may include indications of a first location, a first heading, and a first speed of a transmitter of the first message and the second message. In some examples, the method may include identifying a second location, a second heading, and a second speed of the wireless device; and estimating a Doppler effect associated with the second message based at least in part on one or more of the first location, the first heading, the first speed, the second location, the second heading, and the second speed, or any combination thereof. In some examples, the first message may include an indication of first beamforming vectors of the transmitter. In some examples, the method may include identifying second beamforming vectors of the wireless device, and estimating the Doppler effect associated with the second message based at least in part on the first beamforming vectors and the second beamforming vectors.

In some examples, the method may include identifying first beamforming vectors of a transmitter of the first message and the second message, and second beamforming vectors of the wireless device, and tracking an association of angles of departure (AODs) of the first beamforming vectors and angles of arrival (AOAs) of the second beamforming vectors. In these examples, performing the Doppler effect compensation may include compensating for a Doppler effect in at least one non-line-of-sight (NLOS) path between the transmitter and the wireless device based at least in part on the tracking. In some examples, the method may include identifying, based at least in part on a sensor reading, an existence of a line-of-sight (LOS) path between a transmitter of the first message and the second message and the wireless device. In these examples, performing the Doppler effect compensation may include compensating for a Doppler effect in the LOS path. In some examples, the method may include transmitting a non-acknowledgement message prior to the first message, and receiving the first message in response to transmitting the non-acknowledgement message.

In one example, another apparatus for wireless communication at a wireless device is described. The apparatus may include means for decoding a first message received during a TTI; means for performing a Doppler effect compensation for a second message based at least in part on the first message; and means for decoding the second message based at least in part on the Doppler effect compensation. The second message may also be received during the TTI. The first message may be decoded in accordance with a first MCS, and the second message may be decoded in accordance with a second MCS. In some examples, the second MCS may be higher than the first MCS. In some examples of the apparatus, the first message may include a control transmission and the second message may include a data transmission.

In some examples of the apparatus, the first message may include indications of a first location, a first heading, and a first speed of a transmitter of the first message and the second message. In some examples, the apparatus may include means for identifying a second location, a second heading, and a second speed of the wireless device; and means for estimating a Doppler effect associated with the second message based at least in part on the first location, the first heading, the first speed, the second location, the second heading, and the second speed. In some examples, the first message may include an indication of first beamforming vectors of the transmitter, and the apparatus may further include means for identifying second beamforming vectors of the wireless device, and means for estimating the Doppler effect associated with the second message based at least in part on the first beamforming vectors and the second beamforming vectors.

In some examples, the apparatus may include means for identifying first beamforming vectors of a transmitter of the first message and the second message, and second beamforming vectors of the wireless device; and means for tracking an association of AODs of the first beamforming vectors and AOAs of the second beamforming vectors. In these examples, the means for performing the Doppler effect compensation may include means for compensating for a Doppler effect in at least one NLOS path between the transmitter and the wireless device based at least in part on the tracking. In some examples, the apparatus may include means for identifying, based at least in part on a sensor reading, an existence of a LOS path between a transmitter of the first message and the second message and the wireless device. In these examples, the means for performing the Doppler effect compensation may include means for compensating for a Doppler effect in the LOS path. In some examples, the apparatus may include means for transmitting a non-acknowledgement message prior to the first message, and means for receiving the first message in response to transmitting the non-acknowledgement message.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The demand on rate and reliability of vehicular communications is ever increasing, as a result of applications such as autonomous driving, advanced driver assistance, and social inter-vehicle communications. One challenge to address in vehicular communications is high Doppler effects. In some examples, high Doppler effects are due to high vehicular speeds, particularly in vehicle-to-vehicle (V2V) communications. In the present disclosure, techniques are described in which a transmitting device or a receiving device may compensate for Doppler effects in communications.

In some cases, one or both of the wireless devices involved in a communication may move during the communication. Movement of one or both of the wireless devices may induce a Doppler effect in the communication. When one or both of the wireless devices moves slowly, the Doppler effect may be negligible and may not affect the decoding of the communication by a receiving device. When one or both of the wireless devices moves at a high rate of speed (e.g., because the wireless device is, or is used on, a vehicle such as an automobile, bus, train, or airplane), communication between the wireless devices may be subject to a notable Doppler effect, and the receiving device's ability to decode communications may be affected.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
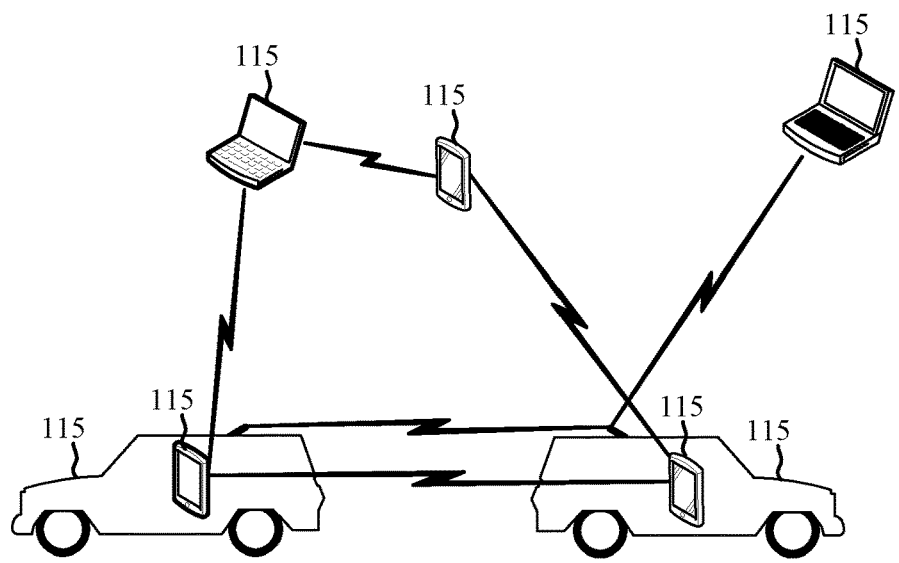
FIG. 1 illustrates an example of a wireless communication system, in accordance with various aspects of the present disclosure.

FIG. 1 illustrates an example of a wireless communication system 100, in accordance with various aspects of the present disclosure. The wireless communication system 100 includes a number of wireless devices 115, each of which may communicate with one or more other wireless devices 115. In some examples, a wireless device 115 may communicate with one or more other wireless devices 115 using D2D communications. Examples of D2D communications include V2V communications and vehicle-to-entity (V2X) communications.

A wireless device 115 may be one or more of a mobile device, a stationary device, a handheld device, a device in a vehicle, an Internet of things (IoT) device, an Internet of Everything (IoE) device, a machine type communication (MTC) device, etc. In some cases, a wireless device 115 may be a cellular phone, a smart phone, a computer (e.g., a personal computer, a tablet computer, a laptop computer, or on-board computer), a health or fitness monitor, a wireless sensor, an automobile, a driver assistance module, a vehicle monitoring module, a vehicle communication module, etc. In some examples, a wireless device 115 may be referred to as a wireless communication device, a mobile station, a subscriber station, a mobile unit, a subscriber unit, a wireless unit, a remote unit, a mobile device, a mobile subscriber station, a UE, an access terminal, a mobile terminal, a wireless terminal, a remote terminal, a handset, a user agent, a mobile client, a client, or some other suitable terminology.

Wireless devices 115 may communicate using D2D communication for a variety of purposes, ranging from less critical purposes (e.g., social inter-vehicle communication) to more critical purposes (e.g., autonomous driving or advanced driver assistance).

In some cases, one or both of the wireless devices 115 involved in a D2D communication may be moving at a high rate of speed. For example, a wireless device 115 may be incorporated into an automobile, bus, train, or airplane, or a user of a wireless device 115 may use his or her wireless device 115 to communicate with another wireless device 115 while on a moving vehicle. In one example of D2D communication between moving devices, a first wireless device 115 aboard a first vehicle traveling one direction may communicate with a second wireless device 115 aboard a second vehicle traveling an opposite direction. When one or both of the wireless devices 115 involved in a D2D communication is moving at a high rate of speed, toward or away from the other wireless device 115, communications between the wireless devices 115 may be associated with a high Doppler effect (also referred to in the present disclosure as a high Doppler condition).

In some examples, a wireless device 115 may include multiple antennas for employing antenna diversity schemes to improve communication quality and reliability between wireless devices 115. Additionally or alternatively, a wireless device 115 may employ Multiple-Input Multiple-Output (MIMO) techniques for D2D communication. MIMO techniques use multiple antennas to transmit or receive multiple spatial layers on multiple paths. Different spatial layers may carry the same or different information. In some cases, signal processing techniques such as beamforming (i.e., directional transmission) may be used with MIMO techniques to coherently combine signal energies and overcome the path loss in specific beam directions.

Figure 2:
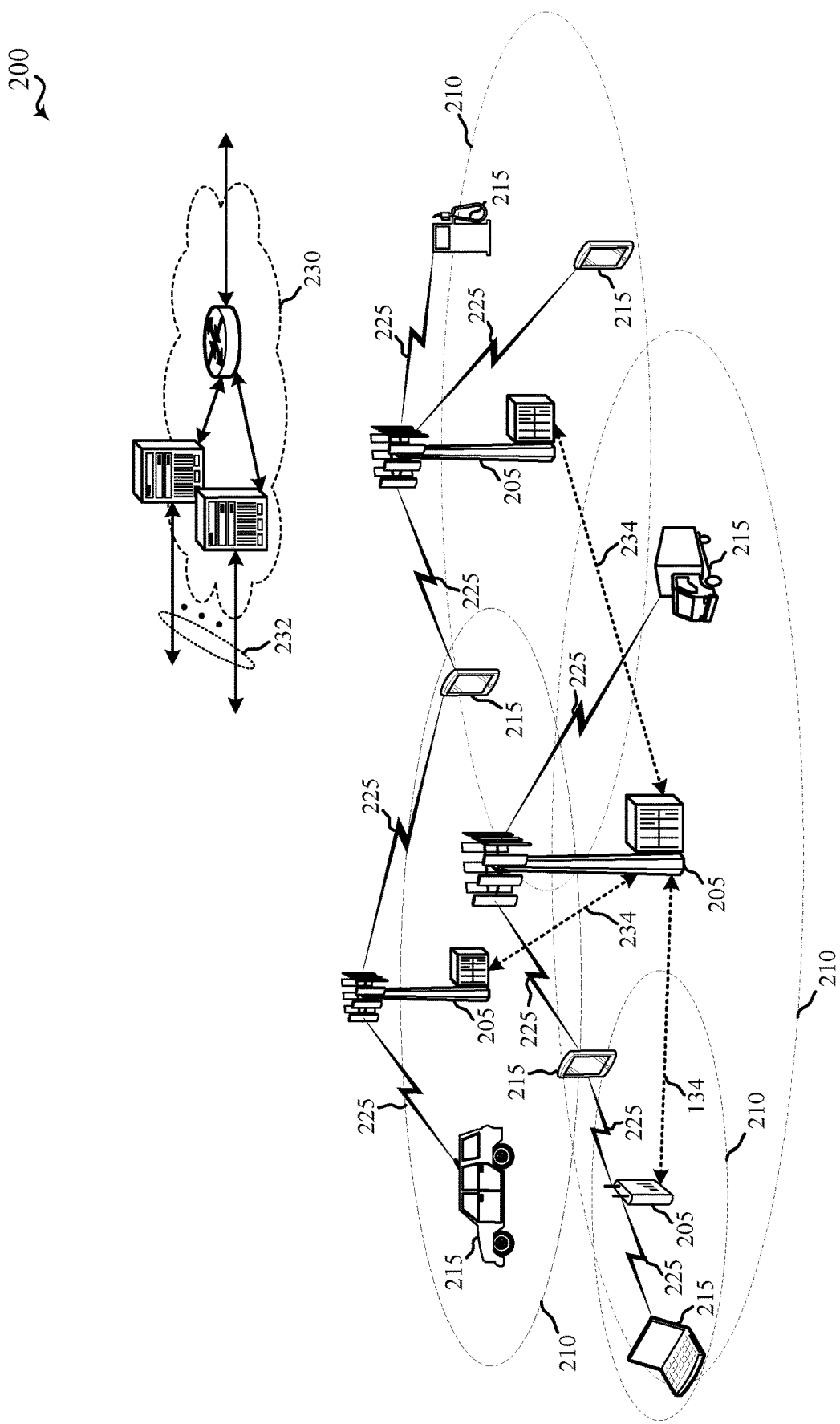
FIG. 2 illustrates an example of a wireless communication system, in accordance with various aspects of the present disclosure.

FIG. 2 illustrates an example of a wireless communication system 200, in accordance with various aspects of the present disclosure. The wireless communication system 200 may include network access devices 205 (e.g., base stations, evolved NodeBs (eNBs), or smart radio heads), UEs 215, and a core network 230. The core network 230 may provide user authentication, access authorization, tracking, Internet Protocol (IP) connectivity, and other access, routing, or mobility functions. The network access devices 205 may interface with the core network 230 through backhaul links 232 (e.g., Si, etc.) and may perform radio configuration and scheduling for communication with the UEs 215, or may operate under the control of a base station controller (not shown). In various examples, the network access devices 205 may communicate, either directly or indirectly (e.g., through core network 230), with each other over backhaul links 234 (e.g., X1, X2, etc.), which may be wired or wireless communication links.

The network access devices 205 may wirelessly communicate with the UEs 215 via one or more network access device antennas. Each of the network access devices 205 may provide communication coverage for a respective geographic coverage area 210. In some examples, a network access device 205 may be a base transceiver station, a radio base station, an access point, a radio transceiver, a NodeB, an eNB, a Home NodeB, a Home eNodeB, a radio head, a smart radio head, etc. The geographic coverage area 210 for a network access device 205 may be divided into sectors making up a portion of the coverage area (not shown). The wireless communication system 200 may include network access device 205 of different types (e.g., macro or small cell base stations). There may be overlapping geographic coverage areas 210 for different technologies.

The UEs 215 may be dispersed throughout the wireless communication system 200, and each UE 215 may be stationary or mobile. A UE 215 may be one or more of a mobile device, a stationary device, a handheld device, a device in a vehicle, an IoT device, an IoE device, a MTC device, etc. In some cases, UE 215 may be a cellular phone, a smart phone, a computer (e.g., a personal computer, a tablet computer, a laptop computer, or on-board computer), a health or fitness monitor, a wireless sensor, an automobile, a driver assistance module, a vehicle monitoring module, a vehicle communication module, etc. In some examples, a UE 215 may be referred to as a wireless device, a wireless communication device, a mobile station, a subscriber station, a mobile unit, a subscriber unit, a wireless unit, a remote unit, a mobile device, a mobile subscriber station, an access terminal, a mobile terminal, a wireless terminal, a remote terminal, a handset, a user agent, a mobile client, a client, or some other suitable terminology. A UE 215 may be able to communicate with one or more types of base station, network access device, or network equipment, including macro eNBs, small cell eNBs, relay base stations, etc.

In some examples, the wireless communication system 200 may include a Long Term Evolution (LTE) or LTE-Advanced (LTE-A) network. In LTE/LTE-A networks, the term eNB may be used to describe a set of one or more network access devices 205. The wireless communication system 200 may include a Heterogeneous LTE/LTE-A network, in which different types of eNBs provide coverage for various geographic coverage areas 210. For example, each eNB or network access device 205 may provide communication coverage for a macro cell, a small cell, or other type of cell. The term "cell" is a 3GPP term that can be used to describe a base station, a carrier or component carrier associated with a base station, or a coverage area (e.g., sector, etc.) of a carrier or base station, depending on context.

The communication links 225 shown in wireless communication system 200 may include downlinks (DLs), from a network access device 205 to a UE 215, and uplinks (ULs), from a UE 215 to a network access device 205. The downlinks may also be called forward links, while the uplinks may also be called reverse links.

In some examples, a network access device 205 or UE 215 may include multiple antennas for employing antenna diversity schemes to improve communication quality and reliability between network access devices 205 and UEs 215. Additionally or alternatively, a network access device 205 or UE 215 may employ MIMO techniques for communication. In some cases, signal processing techniques such as beamforming (i.e., directional transmission) may be used with MIMO techniques to coherently combine signal energies and overcome the path loss in specific beam directions.

In some cases, a UE 215 may be moving at a high rate of speed. For example, a UE 215 may be incorporated into an automobile, bus, train, or airplane, or a user of a UE 215 may use his or her UE 215 while on a moving vehicle. When a UE 215 is moving at a high rate of speed, toward or away from a serving network access device 205, communications between the UE 215 and the network access device 205 may be associated with a high Doppler effect.

In some examples, a wireless device 115 described with reference to FIG. 1 may also communicate as a UE 215 in the wireless communication system of FIG. 2. Similarly, and in some examples, a UE 215 described with reference to FIG. 2 may also communicate as a wireless device 115 in the wireless communication system 100.

When communications received by a wireless device 115, network access device (e.g., a network access device 205), or UE 215 (collectively referred to in the present disclosure as wireless devices) are associated with a high Doppler effect, the wireless device may take longer to decode the communications, or the wireless device may be unable to decode the communications. A high Doppler effect may be relatively difficult to compensate for when the characteristics of the high Doppler effect are unknown in advance of receiving a communication.

Figure 3:
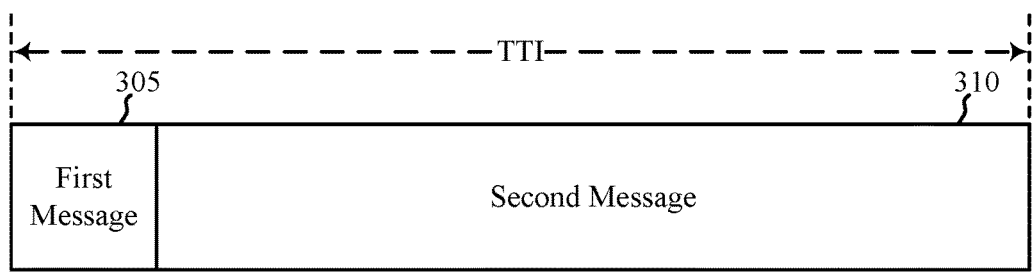
FIG. 3 shows a TTI including a transmission divided into two or more parts, in accordance with various aspects of the present disclosure.

FIG. 3 shows a TTI 300 including a transmission divided into two or more parts, in accordance with various aspects of the present disclosure. The transmission may be transmitted from a first wireless device to a second wireless device. In some examples, each of the first wireless device and the second wireless device may be an example of the wireless devices 115 described with reference to FIG. 1. In some examples, the first wireless device may be an example of the network access devices 205 described with reference to FIG. 2, and the second wireless device may be an example of the UEs 215 described with reference to FIG. 2. In some examples, the first wireless device may be an example of the UEs 215 described with reference to FIG. 2, and the second wireless device may be an example of the network access devices 205 described with reference to FIG. 2.

As shown in FIG. 3, the two or more parts of the transmission may include a first message 305 and a second message 310. In some examples, the first message 305 may include a control transmission, and the second message 310 may include a data transmission. In other examples, the first message 305 may include a first part of a data transmission, and the second message 310 may include a second part of the data transmission. The first message 305 may be transmitted at a lower MCS than the second message 310. The lower MCS may enable a receiving device to decode the first message 305 despite a high Doppler effect condition that impacts transmission of the first message 305. Upon decoding the first message 305, the receiving device may perform a Doppler effect compensation that enables the receiving device to decode the second message 310 in accordance with the higher MCS. In some examples, the first message 305 may include indications of a location, a heading, and a speed of the transmitting device. The first message 305 may also or alternatively include an indication of beamforming vectors of the transmitting device. The location, heading, speed, and/or beamforming vectors of the transmitting device may assist the receiving device in performing the Doppler effect compensation.

Figure 4:
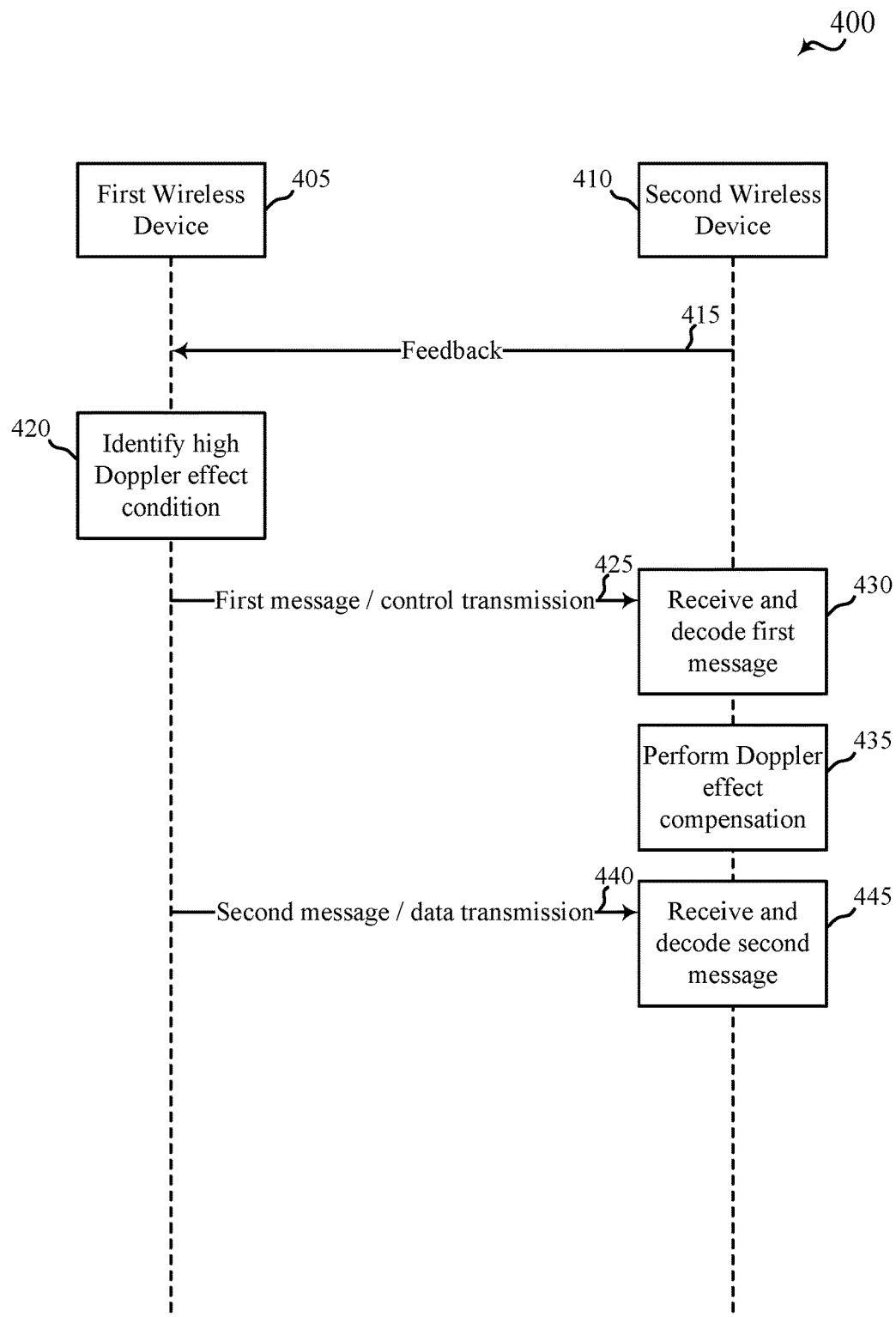
FIG. 4 shows a message flow between a first wireless device and a second wireless device, in accordance with various aspects of the present disclosure.

FIG. 4 shows a message flow 400 between a first wireless device 405 and a second wireless device 410, in accordance with various aspects of the present disclosure. In some examples, each of the first wireless device 405 and the second wireless device 410 may be an example of the wireless devices 115 described with reference to FIG. 1. In some examples, the first wireless device 405 may be an example of the network access devices 205 described with reference to FIG. 2, and the second wireless device 410 may be an example of the UEs 215 described with reference to FIG. 2. In some examples, the first wireless device 405 may be an example of the UEs 215 described with reference to FIG. 2, and the second wireless device 410 may be an example of the network access devices 205 described with reference to FIG. 2.

At 415, the first wireless device 405 may optionally receive, from the second wireless device 410, feedback (e.g., a non-acknowledgement (NACK) message) or a value of a parameter (e.g., a speed or location of the second wireless device 410).

At 420, the first wireless device 405 may optionally identify a high Doppler effect condition. In some examples, the high Doppler effect condition may include at least one of the speed of the first wireless device 405 being greater than a first threshold speed; a value of a parameter received from the second wireless device 410 (e.g., a speed or location of the second wireless device 410); feedback received from the second wireless device 410 (e.g., a non-acknowledgement message); the location of the first wireless device 405 coinciding with a location of a vehicle (and in some cases, a type of vehicle); or a combination thereof.

At 425, the first wireless device 405 may transmit to the second wireless device 410, during a TTI, a first message using a first MCS. In some examples, the first message may be transmitted based at least in part on identifying a high Doppler effect condition at 420 (otherwise, the first message may not be transmitted, or the first message may be transmitted at a second MCS used to transmit a second message at 440). The first message may include a control transmission, and may include indications of a location, a heading, and a speed of the first wireless device 405. In some examples, the first message may also include an indication of first beamforming vectors of the first wireless device 405. At 430, the second wireless device 410 may receive and decode the first message in accordance with the first MCS.

At 435, the second wireless device 410 may perform a Doppler effect compensation for a second message based at least in part on the first message. In some examples, performing the Doppler effect compensation may include identifying a second location, a second heading, and a second speed of the second wireless device 410, and optionally identifying second beamforming vectors of the second wireless device 410. Performing the Doppler effect compensation may also include estimating a Doppler effect associated with the second message based at least in part on the first location, the first heading, the first speed, the second location, the second heading, and the second speed. When the first beamforming vectors and the second beamforming vectors are available, the Doppler effect may also be estimated based at least in part on the first beamforming vectors and the second beamforming vectors.

At 440, the first wireless device 405 may transmit to the second wireless device 410, during the TTI, a second message using a second MCS. The second message may include a data transmission. The second MCS may be higher than the first MCS. For example, an index value of the second MCS may be higher than an index value of the first MCS. Additionally, or alternatively, a data rate of the second MCS may be higher than a data rate of the first MCS. Additionally, or alternatively, a coding rate of the second MCS may be higher than a coding rate of the first MCS. At 445, the second wireless device 410 may decode the second message based at least in part on the Doppler effect compensation, and in accordance with the second MCS.

Figure 5:
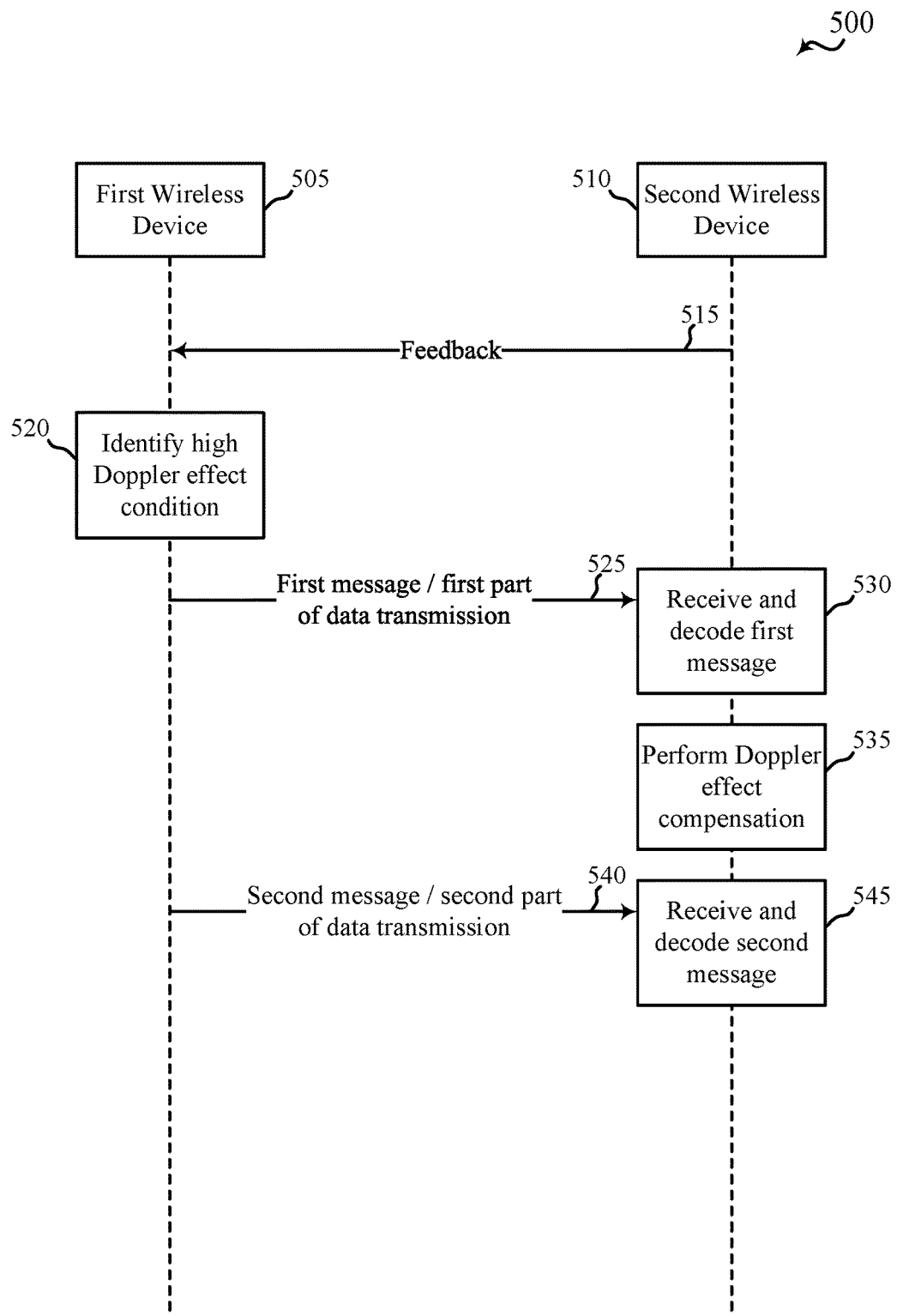
FIG. 5 shows a message flow between a first wireless device and a second wireless device, in accordance with various aspects of the present disclosure.

FIG. 5 shows a message flow 500 between a first wireless device 505 and a second wireless device 510, in accordance with various aspects of the present disclosure. In some examples, each of the first wireless device 505 and the second wireless device 510 may be an example of the wireless devices 115 described with reference to FIG. 1. In some examples, the first wireless device 505 may be an example of the network access devices 205 described with reference to FIG. 2, and the second wireless device 510 may be an example of the UEs 215 described with reference to FIG. 2. In some examples, the first wireless device 505 may be an example of the UEs 215 described with reference to FIG. 2, and the second wireless device 510 may be an example of the network access devices 205 described with reference to FIG. 2.

At 515, the first wireless device 505 may optionally receive, from the second wireless device 510, feedback (e.g., a NACK message) or a value of a parameter (e.g., a speed or location of the second wireless device 510).

At 520, the first wireless device 505 may optionally identify a high Doppler effect condition. In some examples, the high Doppler effect condition may include at least one of the speed of the first wireless device 505 being greater than a first threshold speed; a value of a parameter received from the second wireless device 510 (e.g., a speed or location of the second wireless device 510); feedback received from the second wireless device 510 (e.g., a non-acknowledgement message); the location of the first wireless device 505 coinciding with a location of a vehicle (and in some cases, a type of vehicle); or a combination thereof.

At 525, the first wireless device 505 may transmit to the second wireless device 510, during a TTI, a first message using a first MCS. In some examples, the first message may be transmitted based at least in part on identifying a high Doppler effect condition at 520 (otherwise, the first message may not be transmitted, or the first message may be transmitted at a second MCS used to transmit a second message at 540). The first message may include a first part of a data transmission. At 530, the second wireless device 510 may receive and decode the first message in accordance with the first MCS.

At 535, the second wireless device 510 may perform a Doppler effect compensation for a second message based at least in part on the first message.

At 540, the first wireless device 505 may transmit to the second wireless device 510, during the TTI, a second message using a second MCS. The second message may include a second part of the data transmission. The second MCS may be higher than the first MCS. At 545, the second wireless device 510 may decode the second message based at least in part on the Doppler effect compensation, and in accordance with the second MCS.

In each of the message flow 400 and the message flow 500, the first message may be optionally transmitted using a first RE density, and the first message may include an indication of a second RE density of the second message. In some embodiments, the first message may be transmitted using a first density of RE carrying reference symbols, and the first message may include an indication of a second density of RE carrying reference symbols of the second message.

The second RE density may be greater than the first RE density. In some embodiments, the second density of RE carrying reference symbols may be greater than the first density of RE carrying reference symbols. In some examples, the first message may include an indication of locations of the REs of the second message. In some cases, the first message may include an indication of locations of the density of RE carrying reference symbols of the second message. In some examples, the first message may be optionally transmitted using a first subcarrier spacing, and the first message may include an indication of a second subcarrier spacing of the second message. The second subcarrier spacing may be higher than the first subcarrier spacing. In some examples, the first message may be optionally transmitted using a first RS density, and the first message may include an indication of a second RS density of the second message. The second RS density may be greater than the first RS density.

In each of the message flow 400 and the message flow 500, the second wireless device 410 or 510 may optionally identify first beamforming vectors of the first wireless device 405 or 505 and second beamforming vectors of the second wireless device 410 or 510. The second wireless device 410 or 510 may also track an association of AODs of the first beamforming vectors and AOAs of the second beamforming vectors. In these examples, performance of the Doppler effect compensation by the second wireless device 410 or 510 may include compensating for a Doppler effect in at least one NLOS path between the first wireless device 405 or 505 and the second wireless device 410 or 510 based at least in part on the tracking.

In each of the message flow 400 and the message flow 500, the second wireless device 410 or 510 may optionally identify, based at least in part on a sensor reading, an existence of a LOS path between the first wireless device 405 or 505 and the second wireless device 410 or 510. In these examples, performance of the Doppler effect compensation by the second wireless device 410 or 510 may include compensating for a Doppler effect in the LOS path.

Figure 6:
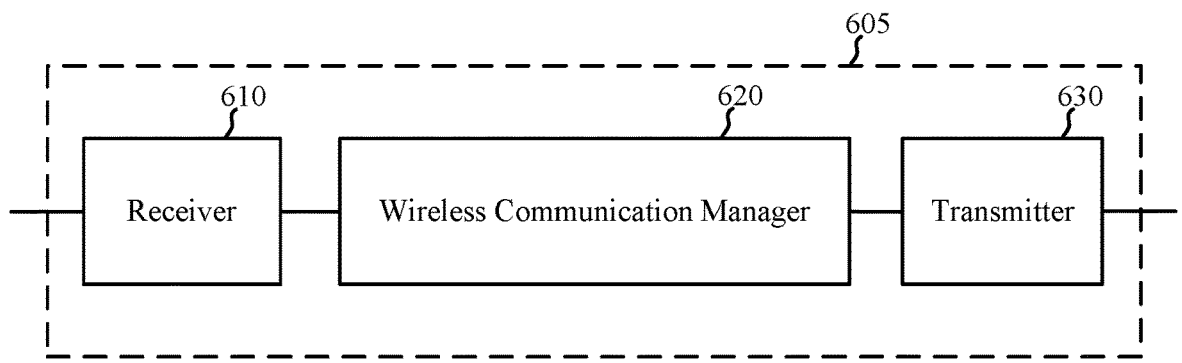
FIG. 6 shows a block diagram of an apparatus for wireless communication, in accordance with various aspects of the present disclosure.

FIG. 6 shows a block diagram 600 of an apparatus 605 for wireless communication, in accordance with various aspects of the present disclosure. The apparatus 605 may be an example of aspects of one or more of the wireless devices 115, 405, 410, 505, or 510 described with reference to FIG. 1, 4, or 5, or aspects of one or more of the network access devices 205 or UEs 215 described with reference to FIG. 2. The apparatus 605 may include a receiver 610, a wireless communication manager 620, and a transmitter 630. The apparatus 605 may also include a processor. Each of these components may be in communication with each other.

The receiver 610 may receive signals or information such as reference signals, control information, or user data associated with various channels (e.g., control channels, data channels, broadcast channels, multicast channels, unicast channels, etc.). Received signals and information may be used by the receiver 610 (e.g., for frequency/time tracking) or passed to other components of the apparatus 605, including the wireless communication manager 620. The receiver 610 may be an example of aspects of the transceiver(s) 1130 or 1250 described with reference to FIG. 11 or 12. The receiver 610 may include or be associated with a single antenna or a plurality of antennas.

The wireless communication manager 620 may be used to manage one or more aspects of wireless communication for the apparatus 605. In some examples, part of the wireless communication manager 620 may be incorporated into or shared with the receiver 610 or the transmitter 630. The wireless communication manager 620 may be an example of aspects of the wireless communication manager 1150 or 1260 described with reference to FIG. 11 or 12. The wireless communication manager 620 may be used to compensate for Doppler effects in transmissions (e.g., when receiving via the receiver 610 and/or when transmitting via the transmitter 630).

The transmitter 630 may transmit signals or information received from other components of the apparatus 605, including the wireless communication manager 620. The signals or information may include, for example, reference signals, control information, or user data associated with various channels (e.g., control channels, data channels, broadcast channels, multicast channels, unicast channels, etc.). In some examples, the transmitter 630 may be collocated with the receiver 610 in a transceiver. The transmitter 630 may be an example of aspects of the transceiver(s) 1130 or 1250 described with reference to FIG. 11 or 12. The transmitter 630 may include or be associated with a single antenna or a plurality of antennas.

Figure 7:
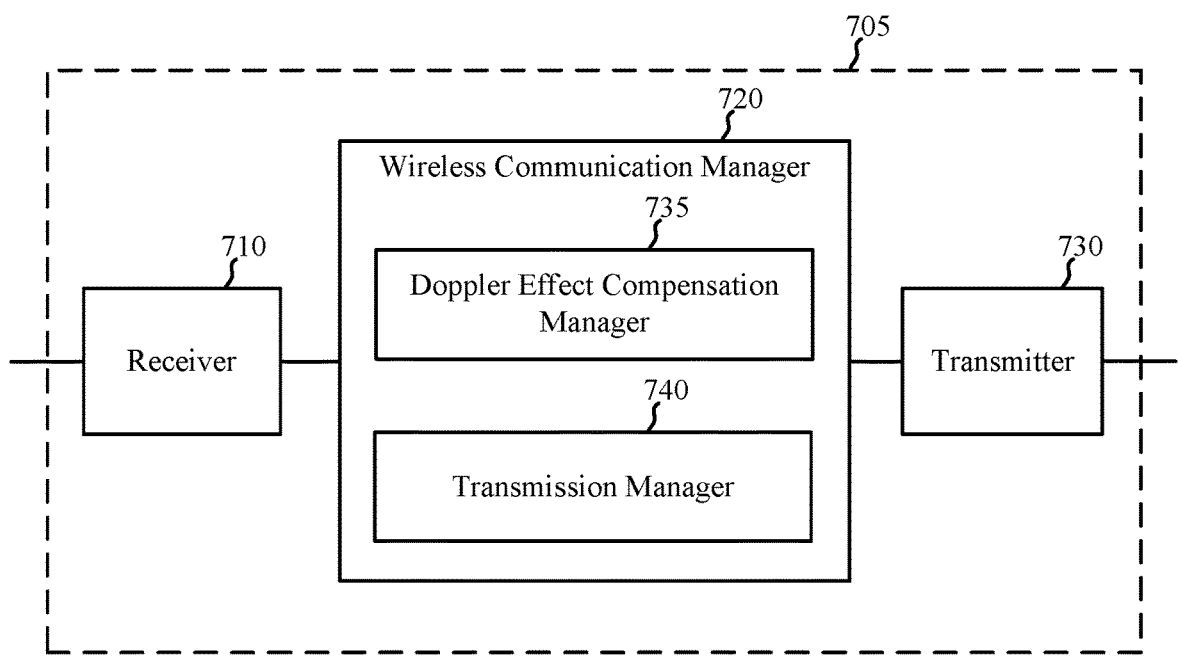
FIG. 7 shows a block diagram of an apparatus for wireless communication, in accordance with various aspects of the present disclosure.

FIG. 7 shows a block diagram 700 of an apparatus 705 for wireless communication, in accordance with various aspects of the present disclosure. The apparatus 705 may be an example of aspects of one or more of the wireless devices 115, 405, 410, 505, or 510 described with reference to FIG. 1, 4, or 5, aspects of one or more of the network access devices 205 or UEs 215 described with reference to FIG. 2, or aspects of the apparatus 605 described with reference to FIG. 6. The apparatus 705 may include a receiver 710, a wireless communication manager 720, and a transmitter 730. The apparatus 705 may also include a processor. Each of these components may be in communication with each other.

The receiver 710 may receive signals or information that may be used by the receiver 710 or passed to other components of the apparatus 705, including the wireless communication manager 720. In some examples, the receiver 710 may perform functions described with reference to the receiver 610 described with reference to FIG. 6. In some examples, the receiver 710 may be an example of aspects of the transceiver(s) 1130 or 1250 described with reference to FIG. 11 or 12. The receiver 710 may include or be associated with a single antenna or a plurality of antennas.

The wireless communication manager 720 may be an example of aspects of the wireless communication manager 620, 1150, or 1260 described with reference to FIG. 6, 11, or 12. The wireless communication manager 720 may include a Doppler effect compensation manager 735 or a transmission manager 740.

The Doppler effect compensation manager 735 may be used to compensate for Doppler effects by formatting a TTI to include a control transmission followed by a data transmission. The control transmission may be associated with a first MCS, and the data transmission may be associated with a second MCS. In some cases, the second MCS may be higher than the first MCS. Alternatively, the Doppler effect compensation manager 735 may be used to compensate for a Doppler effect by subdividing a data transmission into a first part and a second part. The first part of the data transmission may be associated with a first MCS, and the second part of the data transmission may be associated with a second MCS. In some examples, the second MCS may be higher than the first MCS.

The transmission manager 740 may be used to transmit, during the TTI, a first message and a second message. The first message may include the control transmission or first part of the data transmission, and may be transmitted using the first MCS. The first message may also include indications of a location, a heading, and a speed of the apparatus 705. In some examples, the first message may also include an indication of beamforming vectors of the apparatus 705. In some examples, the location, heading, speed, and/or beamforming vectors may be part or all of the control transmission. The second message may include the data transmission or second part of the data transmission, and may be transmitted using the second MCS.

The transmitter 730 may transmit signals or information received from other components of the apparatus 705, including the wireless communication manager 720. In some examples, the transmitter 730 may perform functions described with reference to the transmitter 630 described with reference to FIG. 6. In some examples, the transmitter 630 may be collocated with the receiver 610 in a transceiver. In some examples, the transmitter 730 may be an example of aspects of the transceiver(s) 1130 or 1250 described with reference to FIG. 11 or 12. The transmitter 730 may include or be associated with a single antenna or a plurality of antennas.

Figure 8:
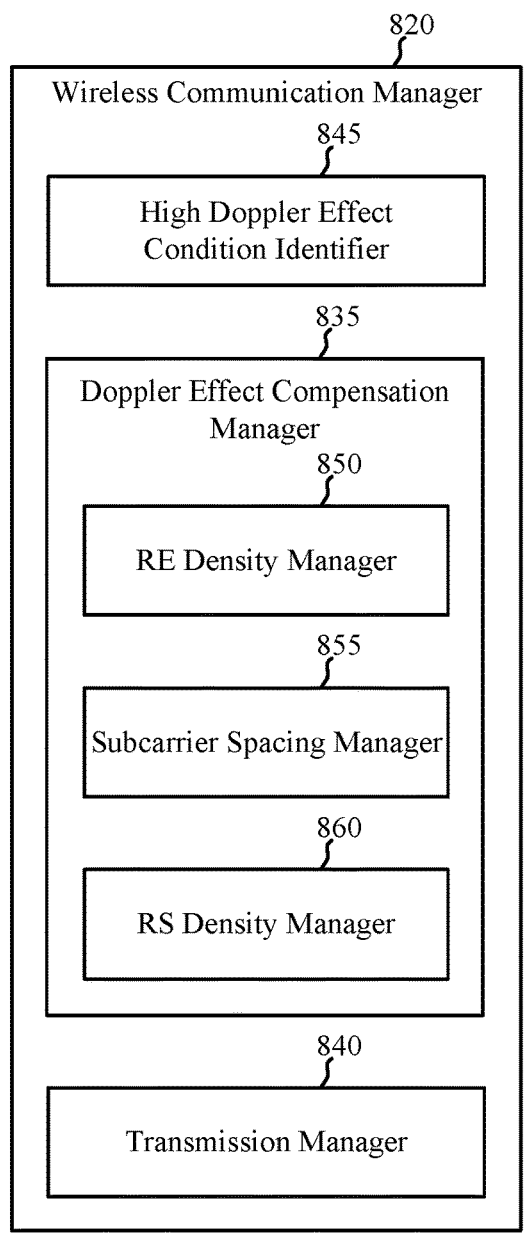
FIG. 8 shows a block diagram of a wireless communication manager, in accordance with various aspects of the present disclosure.

FIG. 8 shows a block diagram 800 of a wireless communication manager 820, in accordance with various aspects of the present disclosure. The wireless communication manager 820 may be an example of aspects of the wireless communication manager 620, 720, 1150, or 1260 described with reference to FIG. 6, 7, 11, or 12.

The wireless communication manager 820 may include a high Doppler effect condition identifier 845, a Doppler effect compensation manager 835, or a transmission manager 840. Each of these components may communicate, directly or indirectly, with one another (e.g., via one or more buses). In some examples, the Doppler effect compensation manager 835 may include a RE density manager 850, a subcarrier spacing manager 855, or a RS density manager 860. The Doppler effect compensation manager 835 and transmission manager 840 may be respective examples of aspects of the Doppler effect compensation manager 735 and transmission manager 740 described with reference to FIG. 7.

The high Doppler effect condition identifier 845 may be used to identify a high Doppler effect condition. In some examples, the high Doppler effect condition may include at least one of the speed of a wireless device that includes the wireless communication manager 820 being greater than a threshold speed; a value of a parameter received from a second wireless device, to which a first message and a second message are transmitted (e.g., a speed or location of the second wireless device); feedback received from the second wireless device (e.g., a non-acknowledgement message); the location of the wireless device that includes the wireless communication manager 820 coinciding with a location of a vehicle (and in some cases, a type of vehicle); or a combination thereof.

The Doppler effect compensation manager 835 may be used to compensate for Doppler effects by formatting a TTI to include a control transmission followed by a data transmission. The control transmission may be associated with a first MCS, and the data transmission may be associated with a second MCS, with the second MCS being higher than the first MCS. Alternatively, the Doppler effect compensation manager 835 may be used to compensate for a Doppler effect by subdividing a data transmission into a first part and a second part. The first part of the data transmission may be associated with a first MCS, and the second part of the data transmission may be associated with a second MCS, with the second MCS being higher than the first MCS. In some examples, the Doppler effect compensation manager 835 may be triggered to compensate for Doppler effects based at least in part on the high Doppler effect condition identifier 845 identifying a high Doppler effect condition.

The transmission manager 740 may be used to transmit, during the TTI, a first message and a second message. The first message may include the control transmission or first part of the data transmission, and may be transmitted using the first MCS. The first message may also include indications of a location, a heading, and a speed of the apparatus 705. In some examples, the first message may also include an indication of beamforming vectors of the apparatus 705. In some examples, the location, heading, speed, and/or beamforming vectors may be part or all of the control transmission. The second message may include the data transmission or second part of the data transmission, and may be transmitted using the second MCS.

In some examples, the RE density manager 850 may be used to identify (or select) a first RE density for the first message and/or a second RE density for the second message. The second RE density may be greater than the first RE density. The Doppler effect compensation manager 835 may format the first message to include an indication of the second RE density and/or an indication of locations of the REs of the second message.

In some examples, the subcarrier spacing manager 855 may be used to identify (or select) a first subcarrier spacing for the first message and/or a second subcarrier spacing for the second message. The second subcarrier spacing may be higher than the first subcarrier spacing. The first message may be formatted to include an indication of the second subcarrier spacing.

In some examples, the RS density manager 860 may be used to identify (or select) a first RS density for the first message and/or a second RS density for the second message. The second RS density may be greater than the first RS density. The Doppler effect compensation manager 835 may format the first message to include an indication of the second RS density.

Figure 9:
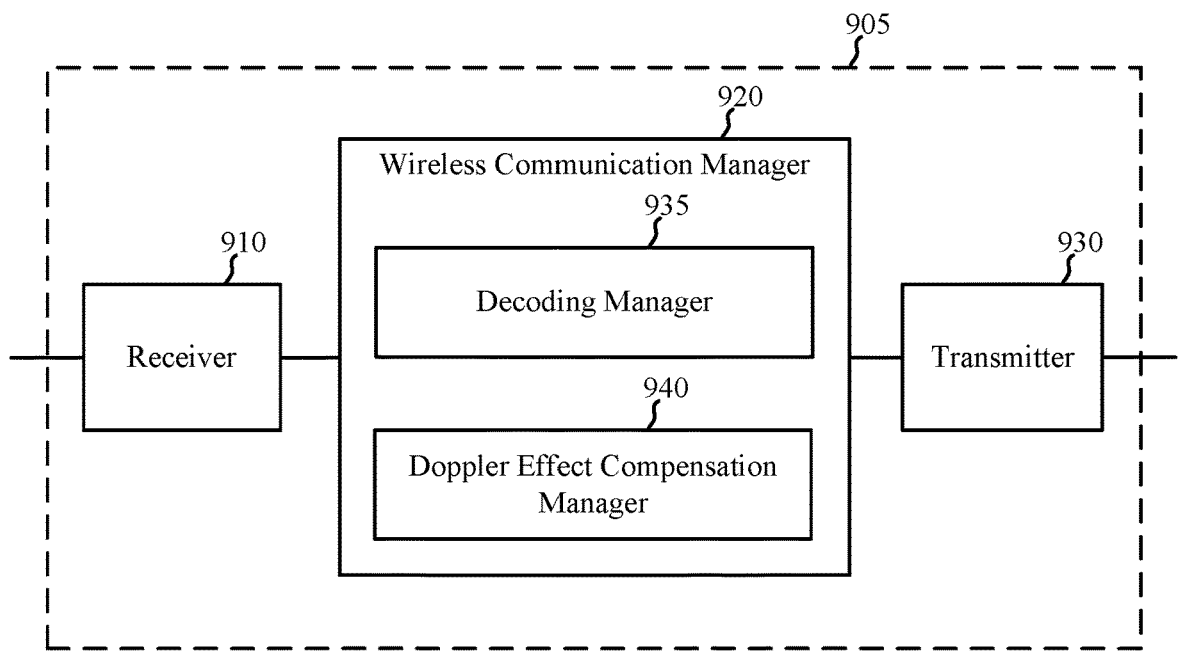
FIG. 9 shows a block diagram of an apparatus for wireless communication, in accordance with various aspects of the present disclosure.

FIG. 9 shows a block diagram 900 of an apparatus 905 for wireless communication, in accordance with various aspects of the present disclosure. The apparatus 905 may be an example of aspects of one or more of the wireless devices 115, 405, 410, 505, or 510 described with reference to FIG. 1, 4, or 5, aspects of one or more of the network access devices 205 or UEs 215 described with reference to FIG. 2, or aspects of the apparatus 605 described with reference to FIG. 6. The apparatus 905 may include a receiver 910, a wireless communication manager 920, and a transmitter 930. The apparatus 905 may also include a processor. Each of these components may be in communication with each other.

The receiver 910 may receive signals or information that may be used by the receiver 910 or passed to other components of the apparatus 905, including the wireless communication manager 920. In some examples, the receiver 910 may perform functions described with reference to the receiver 610 described with reference to FIG. 6. In some examples, the receiver 910 may be an example of aspects of the transceiver(s) 1130 or 1250 described with reference to FIG. 11 or 12. The receiver 910 may include or be associated with a single antenna or a plurality of antennas.

The wireless communication manager 920 may be an example of aspects of the wireless communication manager 620, 1150, or 1260 described with reference to FIG. 6, 11, or 12. The wireless communication manager 920 may include a decoding manager 935 or a Doppler effect compensation manager 940.

The decoding manager 935 may be used to decode a first message received during a TTI. The first message may be decoded in accordance with a first MCS. The Doppler effect compensation manager 940 may be used to perform a Doppler effect compensation for a second message based at least in part on the first message. The decoding manager 935 may also be used to decode the second message based at least in part on the Doppler effect compensation performed by the Doppler effect compensation manager 940. The second message may be received during the same TTI as the first message, but the second message may be decoded in accordance with a second MCS. The second MCS may be higher than the first MCS.

In some examples of the apparatus 905, the first message may include a control transmission and the second message may include a data transmission. In some examples, the first message may include a first part of a data transmission and the second message may include a second part of the data transmission.

The transmitter 930 may transmit signals or information received from other components of the apparatus 905, including the wireless communication manager 920. In some examples, the transmitter 930 may perform functions described with reference to the transmitter 630 described with reference to FIG. 6. In some examples, the transmitter 630 may be collocated with the receiver 610 in a transceiver. In some examples, the transmitter 930 may be an example of aspects of the transceiver(s) 1130 or 1250 described with reference to FIG. 11 or 12. The transmitter 930 may include or be associated with a single antenna or a plurality of antennas.

Figure 10:
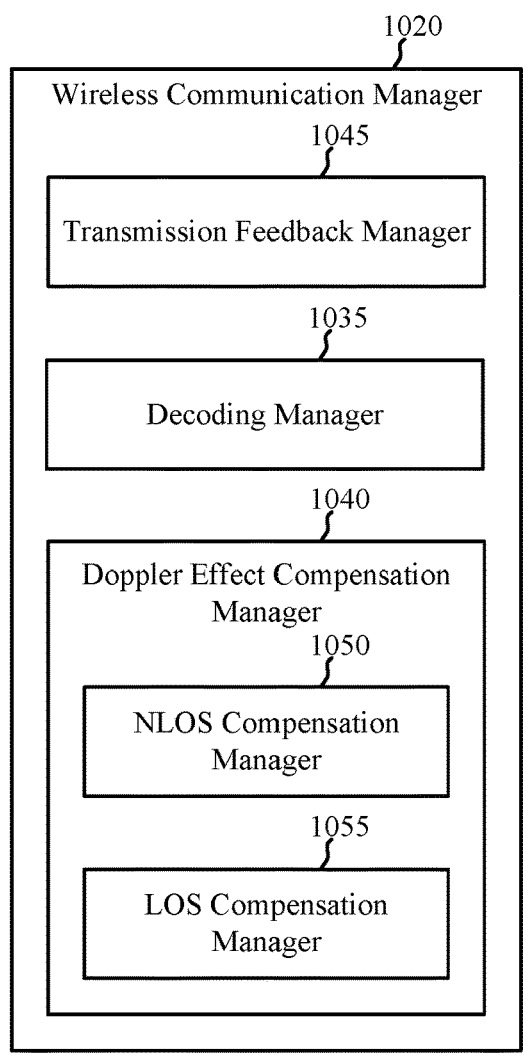
FIG. 10 shows a block diagram of a wireless communication manager, in accordance with various aspects of the present disclosure.

FIG. 10 shows a block diagram 1000 of a wireless communication manager 1020, in accordance with various aspects of the present disclosure. The wireless communication manager 1020 may be an example of aspects of the wireless communication manager 620, 920, 1150, or 1260 described with reference to FIG. 6, 9, 11, or 12.

The wireless communication manager 1020 may include a transmission feedback manager 1045, a decoding manager 1035, or a Doppler effect compensation manager 1040. Each of these components may communicate, directly or indirectly, with one another (e.g., via one or more buses). In some examples, the Doppler effect compensation manager 1040 may include a NLOS compensation manager 1050 or a LOS compensation manager 1055. The decoding manager 1035 and Doppler effect compensation manager 1040 may be respective examples of aspects of the decoding manager 935 and Doppler effect compensation manager 940 described with reference to FIG. 9.

The transmission feedback manager 1045 may be used to transmit a non-acknowledgement message when a message is not received or not properly decoded.

The decoding manager 1035 may be used to decode a first message received during a TTI. The first message may be decoded in accordance with a first MCS. In some examples, the first message may include indications of a first location, a first heading, and a first speed of a transmitter of the first message and a second message. In some examples, the first message may also include an indication of first beamforming vectors of the transmitter.

In some examples, the NLOS compensation manager 1050 may be used to identify first beamforming vectors of a transmitter of the first message and a second message, and second beamforming vectors of the wireless device that includes the wireless communication manager 1020. The NLOS compensation manager 1050 may also be used to track an association of AODs of the first beamforming vectors and AOAs of the second beamforming vectors.

In some examples, the LOS compensation manager 1055 may be used to identify, based at least in part on a sensor reading, an existence of a LOS path between the transmitter of the first message and a second message and the wireless device that includes the wireless communication manager 1020.

The Doppler effect compensation manager 1040 may be used to perform a Doppler effect compensation for a second message based at least in part on the first message. In some examples, the Doppler effect compensation manager 1040 may be used to identify a second location, a second heading, and a second speed of a wireless device that includes the wireless communication manager 1020. In some examples, the Doppler effect compensation manager 1040 may also be used to identify second beamforming vectors of the wireless device that includes the wireless communication manager 1020. The Doppler effect compensation manager 1040 may be further used to estimate a Doppler effect associated with a second message based at least in part on the first location, the first heading, the first speed, the second location, the second heading, and the second speed. When the first beamforming vectors and the second beamforming vectors are available, the Doppler effect may also be estimated based at least in part on the first beamforming vectors and the second beamforming vectors.

In some examples, performing the Doppler effect compensation may include compensating for a Doppler effect in at least one NLOS path between the transmitter and the wireless device based at least in part on the tracking performed by the NLOS compensation manager 1050. In some examples, performing the Doppler effect compensation may include compensating for a Doppler effect in the LOS path.

The decoding manager 1035 may also be used to decode the second message based at least in part on the Doppler effect compensation performed by the Doppler effect compensation manager 1040. The second message may be received during the same TTI as the first message, but the second message may be decoded in accordance with a second MCS. The second MCS may be higher than the first MCS.

In some examples of the wireless communication manager 1020, the first message may include a control transmission and the second message may include a data transmission. In some examples, the first message may include a first part of a data transmission and the second message may include a second part of the data transmission.

Figure 11:
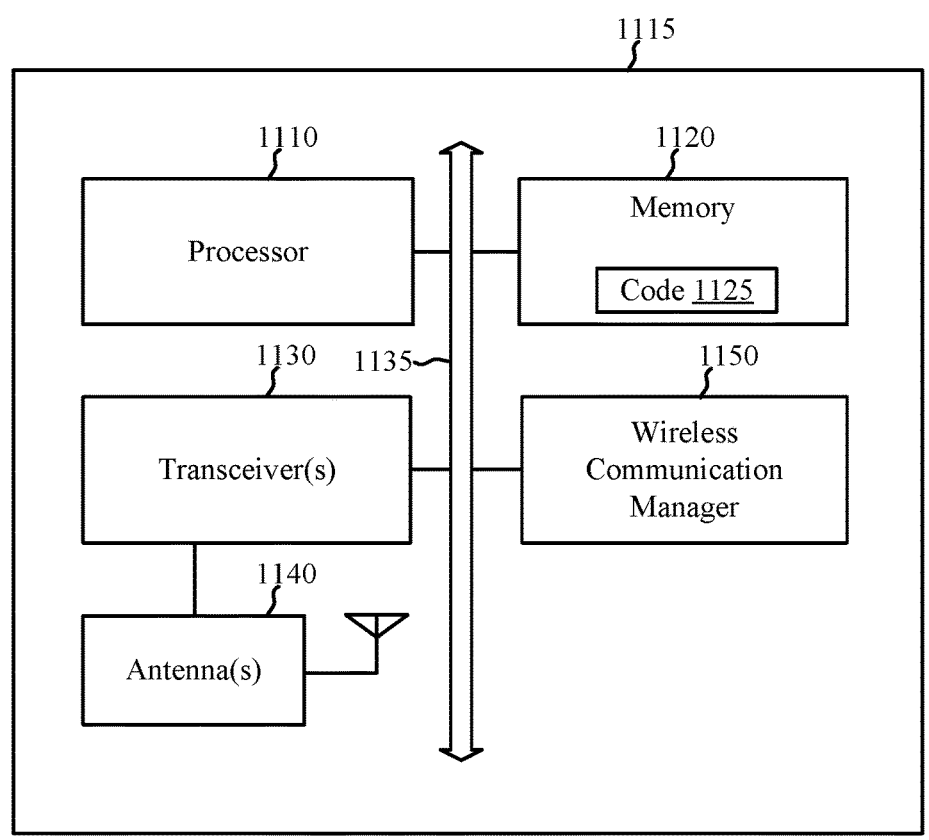
FIG. 11 shows a block diagram of a wireless device for use in wireless communication, in accordance with various aspects of the present disclosure.

FIG. 11 shows a block diagram 1100 of a wireless device 1115 for use in wireless communication, in accordance with various aspects of the present disclosure. The wireless device 1115 may be one or more of a mobile device, a UE, a stationary device, a handheld device, a device in a vehicle, an IoT device, an IoE device, a MTC device, etc. In some cases, the wireless device 1115 may be a cellular phone, a smart phone, a computer (e.g., a personal computer, a tablet computer, a laptop computer, or on-board computer), a health or fitness monitor, a wireless sensor, an automobile, a driver assistance module, a vehicle monitoring module, a vehicle communication module, etc. The wireless device 1115 may, in some examples, have an internal power supply (not shown), such as a small battery, to facilitate mobile operation. In some examples, the wireless device 1115 may be an example of aspects of one or more of the wireless devices 115, 405, 410, 505, or 510 described with reference to FIG. 1, 4, or 5, aspects of one or more of the UEs 215 described with reference to FIG. 2, or aspects of one or more of the apparatuses 605, 705, or 905 described with reference to FIG. 6, 7, or 9. The wireless device 1115 may be configured to implement at least some of the wireless device, UE, or apparatus techniques or functions described with reference to FIG. 1, 2, 3, 4, 5, 6, 7, 8, 9, or 10.

The wireless device 1115 may include a processor 1110, memory 1120, at least one transceiver (represented by transceiver(s) 1130), at least one antenna (represented by antenna(s) 1140), or a wireless communication manager 1150. Each of these components may be in communication with each other, directly or indirectly, over one or more buses 1135.

The memory 1120 may include random access memory (RAM) or read-only memory (ROM). The memory 1120 may store computer-readable, computer-executable code 1125 containing instructions that are configured to, when executed, cause the processor 1110 to perform various functions described herein related to wireless communication, including, for example, compensating for Doppler effects in transmissions. Alternatively, the computer-executable code 1125 may not be directly executable by the processor 1110 but be configured to cause the wireless device 1115 (e.g., when compiled and executed) to perform various of the functions described herein.

The processor 1110 may include an intelligent hardware device, e.g., a central processing unit (CPU), a microcontroller, an application-specific integrated circuit (ASIC), etc. The processor 1110 may process information received through the transceiver(s) 1130 or information to be sent to the transceiver(s) 1130 for transmission through the antenna(s) 1140. The processor 1110 may handle, alone or in connection with the wireless communication manager 1150, various aspects of communicating over (or managing communications over) one or more radio frequency spectrum bands.

The transceiver(s) 1130 may include a modem configured to modulate packets and provide the modulated packets to the antenna(s) 1140 for transmission, and to demodulate packets received from the antenna(s) 1140. The transceiver(s) 1130 may, in some examples, be implemented as one or more transmitters and one or more separate receivers. In some examples, the transceiver(s) 1130 may support communication using MIMO and/or beamforming techniques. The transceiver(s) 1130 may be configured to communicate bi-directionally, via the antenna(s) 1140, with one or more wireless devices or apparatuses, such as one or more of the wireless devices 115, 405, 410, 505, or 510, network access devices 205, UEs 215, or apparatuses 605, 705, or 905 described with reference to FIG. 1, 2, 4, 5, 6, 7, or 9. While the wireless device 1115 may include a single antenna, there may be examples in which the wireless device 1115 may include multiple antennas 1140.

The wireless communication manager 1150 may be configured to perform or control some or all of the wireless device, UE, or apparatus techniques or functions described with reference to FIG. 1, 2, 3, 4, 5, 6, 7, 8, 9, or 10. The wireless communication manager 1150, or portions of it, may include a processor, or some or all of the functions of the wireless communication manager 1150 may be performed by the processor 1110 or in connection with the processor 1110. In some examples, the wireless communication manager 1150 may be an example of the wireless communication manager 620, 720, 820, 920, or 1020 described with reference to FIG. 6, 7, 8, 9, or 10.

Figure 12:
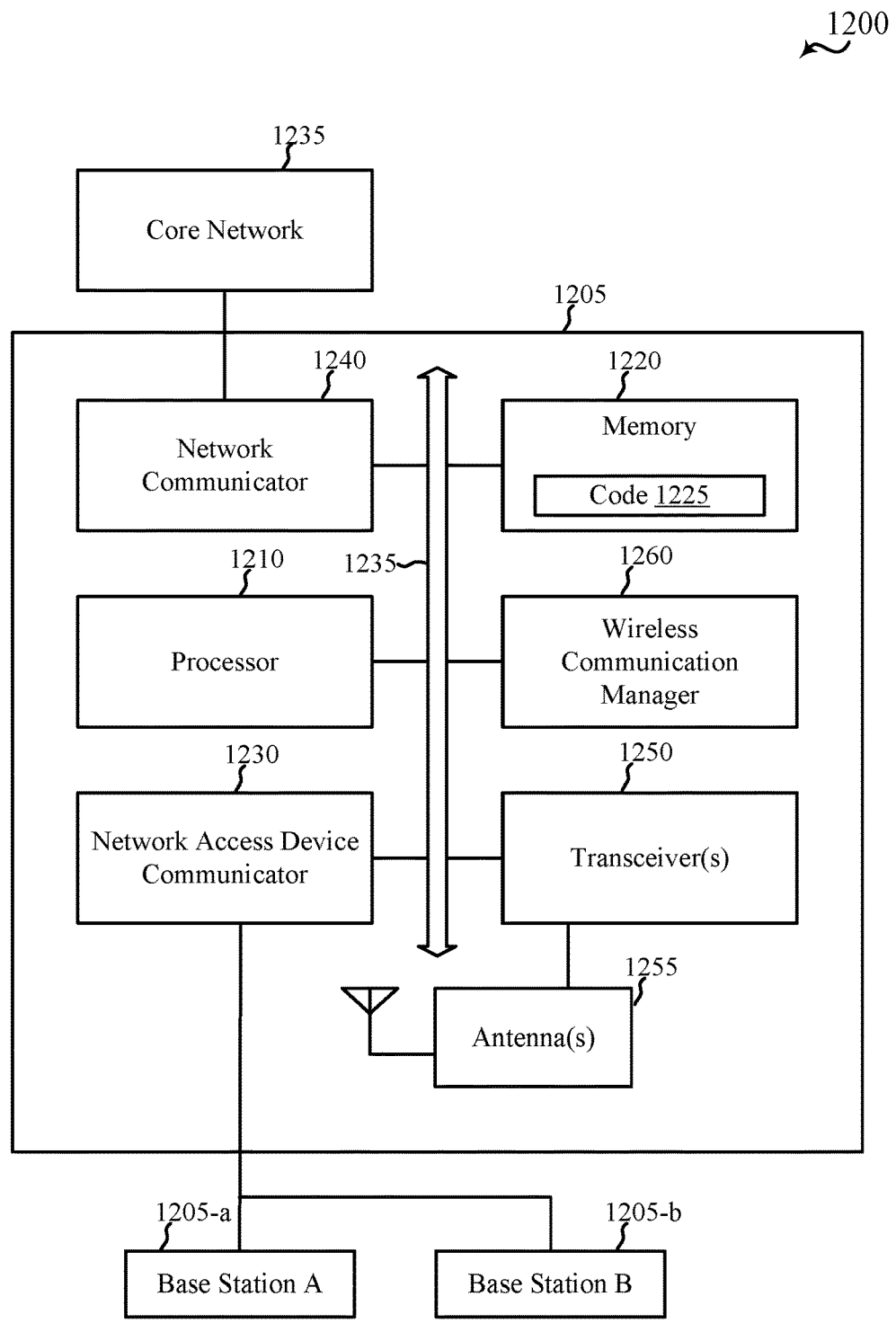
FIG. 12 shows a block diagram of a wireless device for use in wireless communication, in accordance with various aspects of the present disclosure.

FIG. 12 shows a block diagram 1200 of a wireless device 1205 for use in wireless communication, in accordance with various aspects of the present disclosure. In some examples, the wireless device 1205 may be an example of aspects of one or more of the wireless devices 405, 410, 505, or 510 described with reference to FIG. 4 or 5, aspects of one or more of the network access devices (e.g., network access devices 205, eNBs, etc.) described with reference to FIG. 2, or aspects of one or more of the apparatuses 605, 705, or 905 described with reference to FIG. 6, 7, or 9. The wireless device 1205 may be configured to implement or facilitate at least some of the wireless device, network access device, base station, or apparatus techniques or functions described with reference to FIG. 1, 2, 3, 4, 5, 6, 7, 8, 9, or 10.

The wireless device 1205 may include a processor 1210, memory 1220, at least one transceiver (represented by transceiver(s) 1250), at least one antenna (represented by antenna(s) 1255), or a wireless communication manager 1260. The wireless device 1205 may also include one or more of a network access device communicator 1230 or a network communicator 1240. Each of these components may be in communication with each other, directly or indirectly, over one or more buses 1235.

The memory 1220 may include RAM or ROM. The memory 1220 may store computer-readable, computer-executable code 1225 containing instructions that are configured to, when executed, cause the processor 1210 to perform various functions described herein related to wireless communication, including, for example, compensating for Doppler effects in transmissions. Alternatively, the computer-executable code 1225 may not be directly executable by the processor 1210 but be configured to cause the wireless device 1205 (e.g., when compiled and executed) to perform various of the functions described herein.

The processor 1210 may include an intelligent hardware device, e.g., a CPU, a microcontroller, an ASIC, etc. The processor 1210 may process information received through the transceiver(s) 1250, the network access device communicator 1230, or the network communicator 1240. The processor 1210 may also process information to be sent to the transceiver(s) 1250 for transmission through the antenna(s) 1255, information to be sent to the network access device communicator 1230 for transmission to one or more network access devices (e.g., base station 1205-a and/or base station 1205-b), or information to be sent to the network communicator 1240 for transmission to a core network 1245 (which may be an example of one or more aspects of the core network 230 described with reference to FIG. 2). The processor 1210 may handle, alone or in connection with the wireless communication manager 1260, various aspects of communicating over (or managing communications over) one or more radio frequency spectrum bands.

The transceiver(s) 1250 may include a modem configured to modulate packets and provide the modulated packets to the antenna(s) 1255 for transmission, and to demodulate packets received from the antenna(s) 1255. The transceiver(s) 1250 may, in some examples, be implemented as one or more transmitters and one or more separate receivers. In some examples, the transceiver(s) 1250 may support communication using MIMO and/or beamforming techniques. The transceiver(s) 1250 may be configured to communicate bi-directionally, via the antenna(s) 1255, with one or more other wireless devices, such as one or more of the wireless devices 115, 405, 410, 505, 510, or 1115, UEs 215, or apparatuses 605, 705, or 905 described with reference to FIG. 1, 2, 4, 5, 6, 7, 9, or 11. The wireless device 1205 may, for example, include multiple antennas 1255 (e.g., an antenna array). The wireless device 1205 may communicate with the core network 1245 through the network communicator 1240. The wireless device 1205 may also communicate with other network access devices, such as the base station 1205-*a* and/or the base station 1205-*b*, using the network access device communicator 1230.

The wireless communication manager 1260 may be configured to perform or control some or all of the wireless device, network access device, base station, or apparatus techniques or functions described with reference to FIG. 1, 2, 3, 4, 5, 6, 7, 8, 9, or 10. The wireless communication manager 1260, or portions of it, may include a processor, or some or all of the functions of the wireless communication manager 1260 may be performed by the processor 1210 or in connection with the processor 1210. In some examples, the wireless communication manager 1260 may be an example of the wireless communication manager 620, 720, 820, 920, or 1020 described with reference to FIG. 6, 7, 8, 9, or 10.

Figure 13:
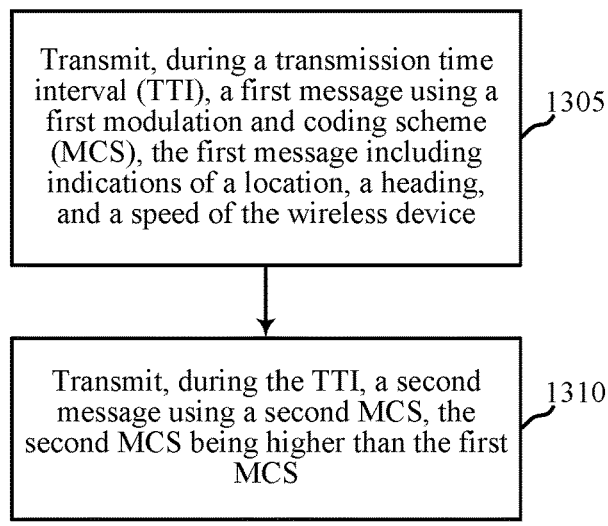
FIG. 13 is a flow chart illustrating an example of a method for wireless communication at a wireless device, in accordance with various aspects of the present disclosure.

FIG. 13 is a flow chart illustrating an example of a method 1300 for wireless communication at a wireless device, in accordance with various aspects of the present disclosure. For clarity, the method 1300 is described below with reference to aspects of one or more of the wireless devices 115, 405, 410, 505, 510, 1115, or 1205 described with reference to FIG. 1, 4, 5, 11, or 12, aspects of one or more of the network access devices 205 or UEs 215 described with reference to FIG. 2, or aspects of one or more of the apparatuses 605 or 705 described with reference to FIG. 6 or 7. In some examples, a wireless device (which in some examples may be a UE, a network access device, a base station, or another type of apparatus) may execute one or more sets of codes to control the functional elements of the wireless device to perform the functions described below. Additionally or alternatively, the wireless device may perform one or more of the functions described below using special-purpose hardware.

At block 1305, the method 1300 may include transmitting, during a TTI, a first message using a first MCS. The first message may include indications of a location, a heading, and a speed of the wireless device performing the method 1300. The operation(s) at block 1305 may be performed using the wireless communication manager 620, 720, 820, 1150, or 1260 described with reference to FIG. 6, 7, 8, 11, or 12, or the Doppler effect compensation manager 735 or 835, or transmission manager 740 or 840, described with reference to FIG. 7 or 8.

In some examples of the method 1300, the first message may include a control transmission and the second message may include a data transmission. In some examples, the first message may include a first part of a data transmission and the second message may include a second part of the data transmission. In some examples, the first message may further include an indication of beamforming vectors of the wireless device.

In some examples of the method 1300, the first message may be transmitted using a first RE density, and the first message may include an indication of a second RE density of the second message. The second RE density may be greater than the first RE density. In some examples, the first message may include an indication of locations of the REs of the second message. In some examples, the first message may be transmitted using a first subcarrier spacing, and the first message may include an indication of a second subcarrier spacing of the second message. The second subcarrier spacing may be higher than the first subcarrier spacing. In some examples, the first message may be transmitted using a first RS density, and the first message may include an indication of a second RS density of the second message. The second RS density may be greater than the first RS density.

At block 1310, the method 1300 may include transmitting, during the TTI, a second message using a second MCS. The second MCS may be higher than the first MCS. The operation(s) at block 1310 may be performed using the wireless communication manager 620, 720, 820, 1150, or 1260 described with reference to FIG. 6, 7, 8, 11, or 12, or the Doppler effect compensation manager 735 or 835, or transmission manager 740 or 840, described with reference to FIG. 7 or 8.

Figure 14:
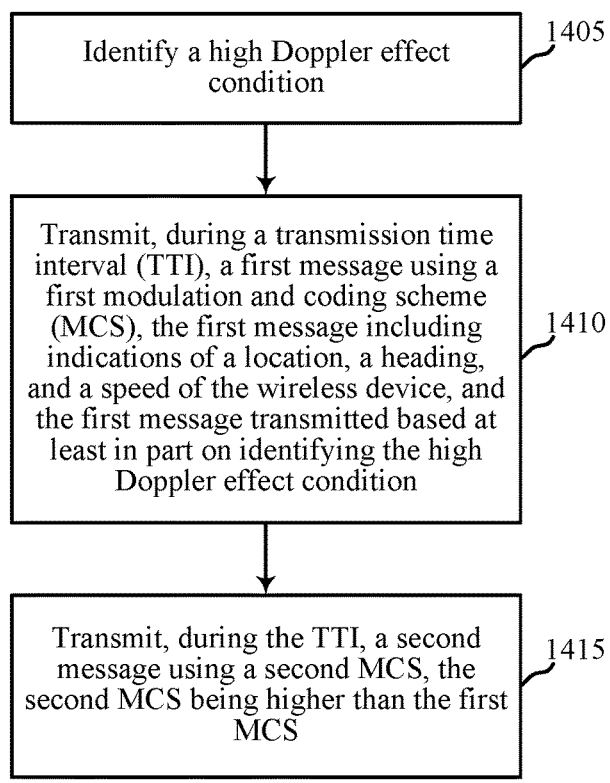
FIG. 14 is a flow chart illustrating an example of a method for wireless communication at a wireless device, in accordance with various aspects of the present disclosure.

FIG. 14 is a flow chart illustrating an example of a method 1400 for wireless communication at a wireless device, in accordance with various aspects of the present disclosure. For clarity, the method 1400 is described below with reference to aspects of one or more of the wireless devices 115, 405, 410, 505, 510, 1115, or 1205 described with reference to FIG. 1, 4, 5, 11, or 12, aspects of one or more of the network access devices 205 or UEs 215 described with reference to FIG. 2, or aspects of one or more of the apparatuses 605 or 705 described with reference to FIG. 6 or 7. In some examples, a wireless device (which in some examples may be a UE, a network access device, a base station, or another type of apparatus) may execute one or more sets of codes to control the functional elements of the wireless device to perform the functions described below. Additionally or alternatively, the wireless device may perform one or more of the functions described below using special-purpose hardware.

At block 1405, the method 1400 may include identifying a high Doppler effect condition. In some examples, the high Doppler effect condition may include at least one of the speed of the wireless device performing the method 1400 being greater than a first threshold speed; a value of a parameter received from a second wireless device, to which a first message and a second message are transmitted at blocks 1410 and 1415 (e.g., a speed or location of the second wireless device); feedback received from the second wireless device (e.g., a non-acknowledgement message); the location of the wireless device performing the method 1400 coinciding with a location of a vehicle (and in some cases, a type of vehicle); or a combination thereof. The operation(s) at block 1405 may be performed using the wireless communication manager 620, 720, 820, 1150, or 1260 described with reference to FIG. 6, 7, 8, 11, or 12, or the high Doppler effect condition identifier 845 described with reference to FIG. 8.

At block 1410, the method 1400 may include transmitting, during a TTI, a first message using a first MCS. The first message may be transmitted using the first MCS based at least in part on identifying the high Doppler effect condition (otherwise, the first message may not be transmitted, or the first message may be transmitted at the second MCS used to transmit the second message at block 1415). The first message may include indications of a location, a heading, and a speed of the wireless device performing the method 1400. The operation(s) at block 1410 may be performed using the wireless communication manager 620, 720, 820, 1150, or 1260 described with reference to FIG. 6, 7, 8, 11, or 12, or the Doppler effect compensation manager 735 or 835, or transmission manager 740 or 840, described with reference to FIG. 7 or 8.

In some examples of the method 1400, the first message may include a control transmission and the second message may include a data transmission. In some examples, the first message may include a first part of a data transmission and the second message may include a second part of the data transmission. In some examples, the first message may further include an indication of beamforming vectors of the wireless device.

In some examples of the method 1400, the first message may be transmitted using a first RE density, and the first message may include an indication of a second RE density of the second message. The second RE density may be greater than the first RE density. In some examples, the first message may include an indication of locations of the REs of the second message. In some examples, the first message may be transmitted using a first subcarrier spacing, and the first message may include an indication of a second subcarrier spacing of the second message. The second subcarrier spacing may be higher than the first subcarrier spacing. In some examples, the first message may be transmitted using a first RS density, and the first message may include an indication of a second RS density of the second message. The second RS density may be greater than the first RS density.

At block 1415, the method 1400 may include transmitting, during the TTI, a second message using a second MCS. The second MCS may be higher than the first MCS. The operation(s) at block 1415 may be performed using the wireless communication manager 620, 720, 820, 1150, or 1260 described with reference to FIG. 6, 7, 8, 11, or 12, or the Doppler effect compensation manager 735 or 835, or transmission manager 740 or 840, described with reference to FIG. 7 or 8.

Figure 15:
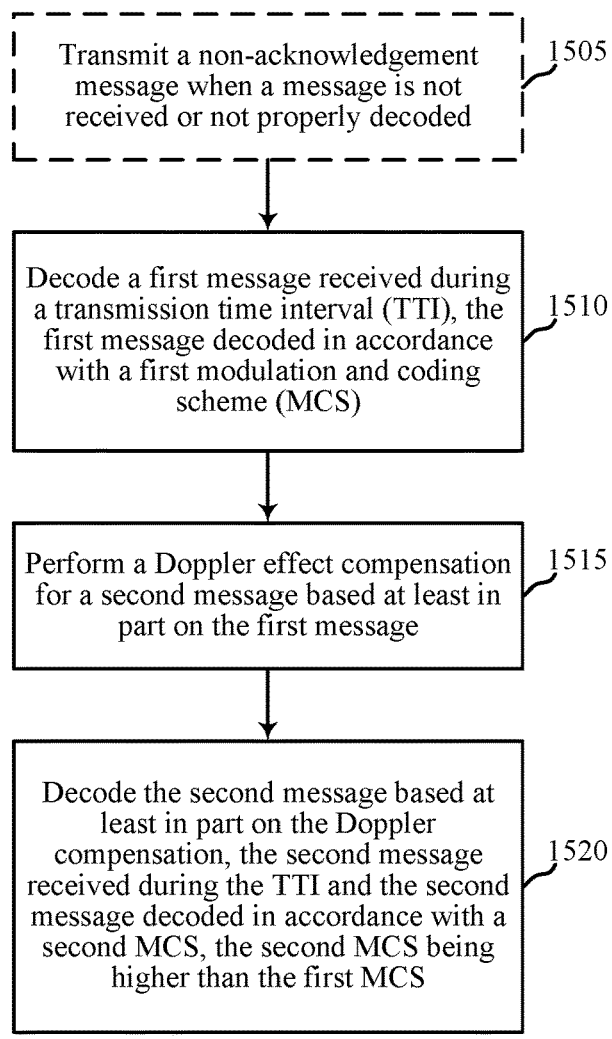
FIG. 15 is a flow chart illustrating an example of a method for wireless communication at a wireless device, in accordance with various aspects of the present disclosure.

FIG. 15 is a flow chart illustrating an example of a method 1500 for wireless communication at a wireless device, in accordance with various aspects of the present disclosure. For clarity, the method 1500 is described below with reference to aspects of one or more of the wireless devices 115, 405, 410, 505, 510, 1115, or 1205 described with reference to FIG. 1, 4, 5, 11, or 12, aspects of one or more of the network access devices 205 or UEs 215 described with reference to FIG. 2, or aspects of one or more of the apparatuses 605 or 905 described with reference to FIG. 6 or 9. In some examples, a wireless device (which in some examples may be a UE, a network access device, a base station, or another type of apparatus) may execute one or more sets of codes to control the functional elements of the wireless device to perform the functions described below. Additionally or alternatively, the wireless device may perform one or more of the functions described below using special-purpose hardware.

At block 1505, the method 1500 may optionally include transmitting a NACK message when a message is not received or not properly decoded. The operation(s) at block 1505 may be performed using the wireless communication manager 620, 920, 1020, 1150, or 1260 described with reference to FIG. 6, 7, 8, 11, or 12, or the transmission feedback manager 1045 described with reference to FIG. 10.

At block 1510, the method 1500 may include decoding a first message received during a TTI. The first message may be decoded in accordance with a first MCS. In some examples, the first message may be received in response to transmitting the NACK message at block 1505. The operation(s) at block 1510 may be performed using the wireless communication manager 620, 920, 1020, 1150, or 1260 described with reference to FIG. 6, 7, 8, 11, or 12, or the decoding manager 935 or 1035 described with reference to FIG. 9 or 10.

At block 1515, the method 1500 may include performing a Doppler effect compensation for a second message based at least in part on the first message. The operation(s) at block 1515 may be performed using the wireless communication manager 620, 920, 1020, 1150, or 1260 described with reference to FIG. 6, 7, 8, 11, or 12, or the Doppler effect compensation manager 940 or 1040 described with reference to FIG. 9 or 10.

At block 1520, the method 1500 may include decoding the second message based at least in part on the Doppler effect compensation. The second message may be received during the TTI, and the second message may be decoded in accordance with a second MCS. The second MCS may be higher than the first MCS. The operation(s) at block 1520 may be performed using the wireless communication manager 620, 920, 1020, 1150, or 1260 described with reference to FIG. 6, 7, 8, 11, or 12, or the decoding manager 935 or 1035 described with reference to FIG. 9 or 10.

In some examples of the method 1500, the first message may include a control transmission and the second message may include a data transmission. In some examples, the first message may include a first part of a data transmission and the second message may include a second part of the data transmission.

Figure 16:
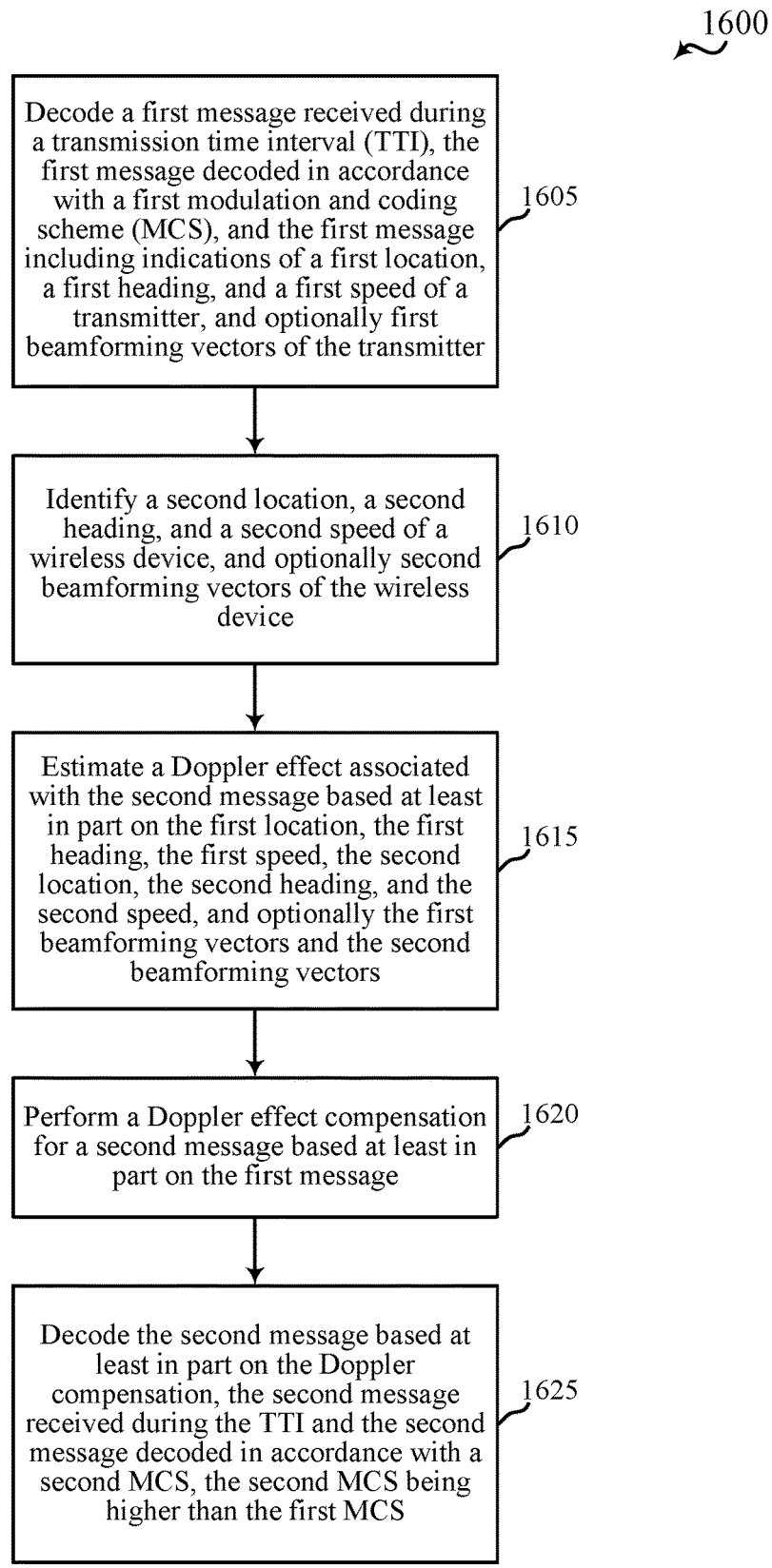
FIG. 16 is a flow chart illustrating an example of a method for wireless communication at a wireless device, in accordance with various aspects of the present disclosure.

FIG. 16 is a flow chart illustrating an example of a method 1600 for wireless communication at a wireless device, in accordance with various aspects of the present disclosure. For clarity, the method 1600 is described below with reference to aspects of one or more of the wireless devices 115, 405, 410, 505, 510, 1115, or 1205 described with reference to FIG. 1, 4, 5, 11, or 12, aspects of one or more of the network access devices 205 or UEs 215 described with reference to FIG. 2, or aspects of one or more of the apparatuses 605 or 905 described with reference to FIG. 6 or 9. In some examples, a wireless device (which in some examples may be a UE, a network access device, a base station, or another type of apparatus) may execute one or more sets of codes to control the functional elements of the wireless device to perform the functions described below. Additionally or alternatively, the wireless device may perform one or more of the functions described below using special-purpose hardware.

At block 1605, the method 1600 may include decoding a first message received during a TTI. The first message may be decoded in accordance with a first MCS. The first message may include indications of a first location, a first heading, and a first speed of a transmitter of the first message and a second message. In some examples, the first message may also include an indication of first beamforming vectors of the transmitter. The operation(s) at block 1605 may be performed using the wireless communication manager 620, 920, 1020, 1150, or 1260 described with reference to FIG. 6, 7, 8, 11, or 12, or the decoding manager 935 or 1035 described with reference to FIG. 9 or 10.

At block 1610, the method 1600 may include identifying a second location, a second heading, and a second speed of the wireless device performing the method 1600. In some examples, the operation(s) at block 1610 may also include identifying second beamforming vectors of the wireless device performing the method 1600. The operation(s) at block 1610 may be performed using the wireless communication manager 620, 920, 1020, 1150, or 1260 described with reference to FIG. 6, 7, 8, 11, or 12, or the Doppler effect compensation manager 940 or 1040 described with reference to FIG. 9 or 10.

At block 1615, the method 1600 may include estimating a Doppler effect associated with a second message based at least in part on the first location, the first heading, the first speed, the second location, the second heading, and the second speed. When the first beamforming vectors and the second beamforming vectors are available, the Doppler effect may also be estimated based at least in part on the first beamforming vectors and the second beamforming vectors. The operation(s) at block 1615 may be performed using the wireless communication manager 620, 920, 1020, 1150, or 1260 described with reference to FIG. 6, 7, 8, 11, or 12, or the Doppler effect compensation manager 940 or 1040 described with reference to FIG. 9 or 10.

At block 1620, the method 1600 may include performing a Doppler effect compensation for the second message based at least in part on the first message. The operation(s) at block 1620 may be performed using the wireless communication manager 620, 920, 1020, 1150, or 1260 described with reference to FIG. 6, 7, 8, 11, or 12, or the Doppler effect compensation manager 940 or 1040 described with reference to FIG. 9 or 10.

At block 1625, the method 1600 may include decoding the second message based at least in part on the Doppler effect compensation. The second message may be received during the TTI, and the second message may be decoded in accordance with a second MCS. The second MCS may be higher than the first MCS. The operation(s) at block 1625 may be performed using the wireless communication manager 620, 920, 1020, 1150, or 1260 described with reference to FIG. 6, 7, 8, 11, or 12, or the decoding manager 935 or 1035 described with reference to FIG. 9 or 10.

In some examples of the method 1600, the first message may include a control transmission and the second message may include a data transmission.

Figure 17:
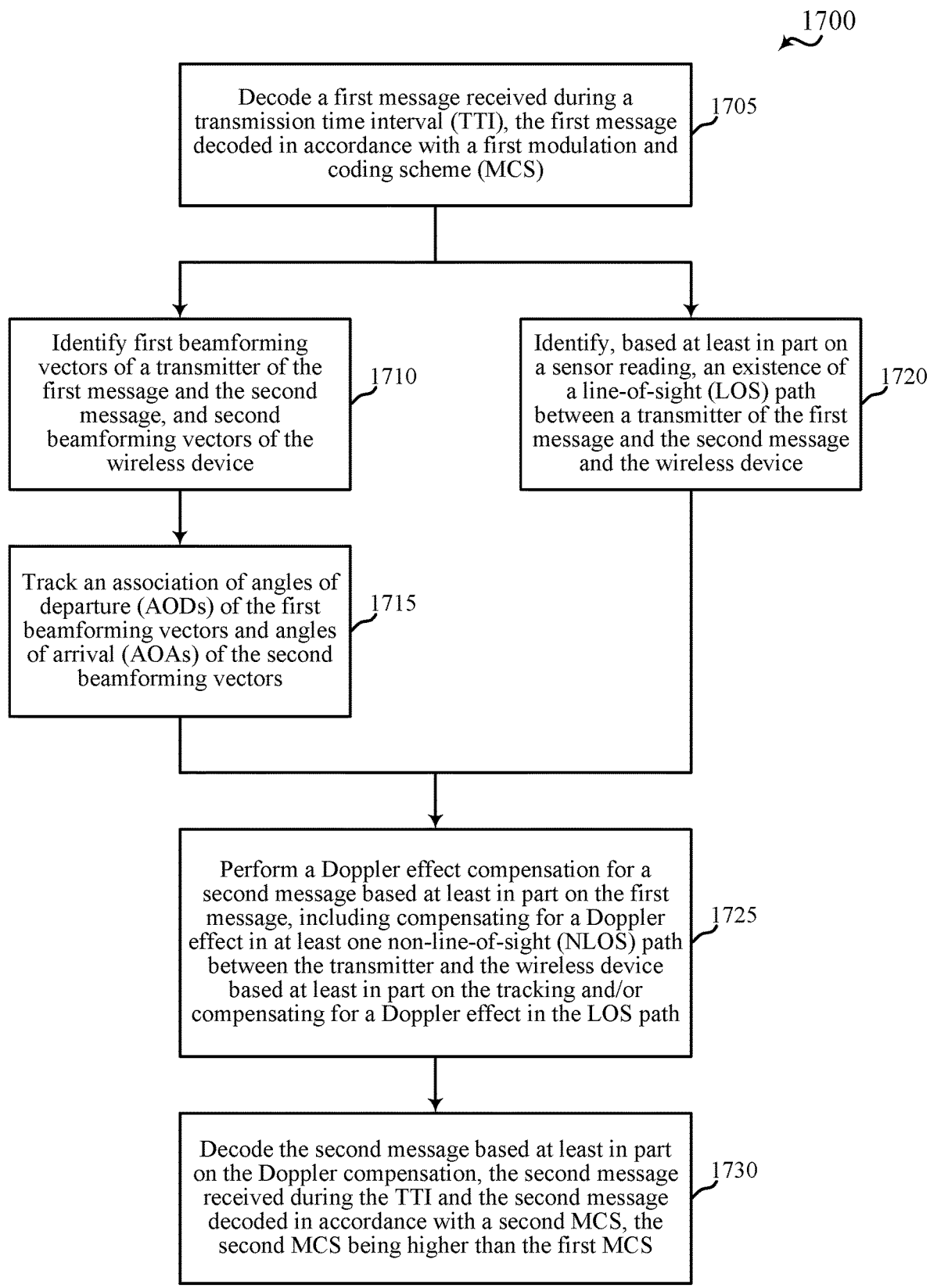
FIG. 17 is a flow chart illustrating an example of a method for wireless communication at a wireless device, in accordance with various aspects of the present disclosure.

FIG. 17 is a flow chart illustrating an example of a method 1700 for wireless communication at a wireless device, in accordance with various aspects of the present disclosure. For clarity, the method 1700 is described below with reference to aspects of one or more of the wireless devices 115, 405, 410, 505, 510, 1115, or 1205 described with reference to FIG. 1, 4, 5, 11, or 12, aspects of one or more of the network access devices 205 or UEs 215 described with reference to FIG. 2, or aspects of one or more of the apparatuses 605 or 905 described with reference to FIG. 6 or 9. In some examples, a wireless device (which in some examples may be a UE, a network access device, a base station, or another type of apparatus) may execute one or more sets of codes to control the functional elements of the wireless device to perform the functions described below. Additionally or alternatively, the wireless device may perform one or more of the functions described below using special-purpose hardware.

At block 1705, the method 1700 may include decoding a first message received during a TTI. The first message may be decoded in accordance with a first MCS. In some examples, the first message may include indications of a first location, a first heading, and a first speed of a transmitter of the first message and a second message. In some examples, the first message may also include an indication of first beamforming vectors of the transmitter. The operation(s) at block 1705 may be performed using the wireless communication manager 620, 920, 1020, 1150, or 1260 described with reference to FIG. 6, 7, 8, 11, or 12, or the decoding manager 935 or 1035 described with reference to FIG. 9 or 10.

Following the operation(s) at block 1705, the method 1700 may continue at block 1710 and/or at block 1720. At block 1710, the method 1700 may include identifying first beamforming vectors of a transmitter of the first message and a second message, and second beamforming vectors of the wireless device performing the method 1700. The operation(s) at block 1710 may be performed using the wireless communication manager 620, 920, 1020, 1150, or 1260 described with reference to FIG. 6, 7, 8, 11, or 12, the Doppler effect compensation manager 940 or 1040 described with reference to FIG. 9 or 10, or the NLOS compensation manager 1050 described with reference to FIG. 10.

At block 1715, the method 1700 may include tracking an association of AODs of the first beamforming vectors and AOAs of the second beamforming vectors. The operation(s) at block 1715 may be performed using the wireless communication manager 620, 920, 1020, 1150, or 1260 described with reference to FIG. 6, 7, 8, 11, or 12, the Doppler effect compensation manager 940 or 1040 described with reference to FIG. 9 or 10, or the NLOS compensation manager 1050 described with reference to FIG. 10.

At block 1720, the method 1700 may include identifying, based at least in part on a sensor reading, an existence of a LOS path between the transmitter of the first message and a second message and the wireless device performing the method 1700. The operation(s) at block 1720 may be performed using the wireless communication manager 620, 920, 1020, 1150, or 1260 described with reference to FIG. 6, 7, 8, 11, or 12, the Doppler effect compensation manager 940 or 1040 described with reference to FIG. 9 or 10, or the LOS compensation manager 1055 described with reference to FIG. 10.

At block 1725, the method 1700 may include performing a Doppler effect compensation for a second message based at least in part on the first message. In some examples, performing the Doppler effect compensation may include compensating for a Doppler effect in at least one NLOS path between the transmitter and the wireless device based at least in part on the tracking performed at block 1715. In some examples, performing the Doppler effect compensation may include compensating for a Doppler effect in the LOS path. The operation(s) at block 1725 may be performed using the wireless communication manager 620, 920, 1020, 1150, or 1260 described with reference to FIG. 6, 7, 8, 11, or 12, the Doppler effect compensation manager 940 or 1040 described with reference to FIG. 9 or 10, or the NLOS compensation manager 1050 or LOS compensation manager 1055 described with reference to FIG. 10.

At block 1730, the method 1700 may include decoding the second message based at least in part on the Doppler effect compensation. The second message may be received during the TTI, and the second message may be decoded in accordance with a second MCS. The second MCS may be higher than the first MCS. The operation(s) at block 1730 may be performed using the wireless communication manager 620, 920, 1020, 1150, or 1260 described with reference to FIG. 6, 7, 8, 11, or 12, or the decoding manager 935 or 1035 described with reference to FIG. 9 or 10.

In some examples of the method 1700, the first message may include a control transmission and the second message may include a data transmission. In some examples, the first message may include a first part of a data transmission and the second message may include a second part of the data transmission.

The methods described above illustrate possible implementations of the techniques described in the present disclosure. In some examples, aspects of the methods 1300 and 1400 described with reference to FIGS. 13 and 14 may be combined, or aspects of the methods 1500, 1600, and/or 1700 may be combined. In some examples, the operations of the methods may be performed in different orders or include different operations. In some examples, aspects of each of the methods may include steps or aspects of the other methods, or other steps or techniques described herein.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1×, 1×, etc. IS-856 (TIA-856) may be referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed spectrum. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a wireless device, comprising:
   transmitting, during a transmission time interval (TTI) and based at least in part on a Doppler effect condition satisfying a Doppler effect condition threshold, a first message comprising a control transmission using a first modulation and coding scheme (MCS), the first message comprising indications of a location, a heading, and a speed of the wireless device; and
   transmitting, during the TTI, a second message comprising a data transmission using a second MCS, the second MCS being higher than the first MCS, wherein the first message is transmitted using a first density of resource element (RE) carrying reference symbols, the first message comprising an indication of a second density of RE carrying reference symbols of the second message, and the second density of RE carrying reference symbols is greater than the first density of RE carrying reference symbols.

2. The method of claim 1, further comprising:
   transmitting, during the TTI, the first message using the first MCS and the second message using the second MCS based at least in part on the Doppler effect condition.

3. The method of claim 1, wherein the first message further comprises an indication of beamforming vectors of the wireless device.

4. The method of claim 1, wherein the first message comprises an indication of locations of the second density of RE carrying reference symbols of the second message.

5. The method of claim 1, wherein the first message is transmitted using a first subcarrier spacing, the first message comprises an indication of a second subcarrier spacing of the second message, and the second subcarrier spacing is higher than the first subcarrier spacing.

6. An apparatus for wireless communication at a wireless device, comprising:
   means for transmitting, during a transmission time interval (TTI) and based at least in part on a Doppler effect condition satisfying a Doppler effect condition threshold, a first message comprising a control transmission using a first modulation and coding scheme (MCS), the first message comprising indications of a location, a heading, and a speed of the wireless device; and
   means for transmitting, during the TTI, a second message comprising a data transmission using a second MCS, the second MCS being higher than the first MCS, wherein the first message is transmitted using a first density of resource element (RE) carrying reference symbols, the first message comprising an indication of a second density of RE carrying reference symbols of the second message, and the second density of RE carrying reference symbols is greater than the first density of RE carrying reference symbols.

7. The apparatus of claim 6, further comprising:
   means for transmitting, during the TTI, the first message using the first MCS and the second message using the second MCS based at least in part on the Doppler effect condition.

8. The apparatus of claim 6, wherein the first message comprises a first part of the data transmission and the second message comprises a second part of the data transmission, and wherein the first message further comprises an indication of beamforming vectors of the wireless device.

9. The apparatus of claim 6, wherein the first message comprises an indication of locations of the second density of RE carrying reference symbols of the second message.

10. The apparatus of claim 6, wherein the first message is transmitted using a first subcarrier spacing, the first message comprises an indication of a second subcarrier spacing of the second message, and the second subcarrier spacing is higher than the first subcarrier spacing.

11. A method for wireless communication at a wireless device, comprising:
    decoding, in accordance with a first modulation and coding scheme (MCS), a first message comprising a control transmission received during a transmission time interval (TTI) and based at least in part on a Doppler effect condition satisfying a Doppler effect condition threshold, the first message comprising indications of a first location, a first heading, and a first speed of the wireless device;
    performing a Doppler effect compensation for a second message comprising a data transmission based at least in part on the first message, wherein the first message is associated with a first density of resource element (RE) carrying reference symbols, the first message comprising an indication of a second density of RE carrying reference symbols of the second message, and the second density of RE carrying reference symbols is greater than the first density of RE carrying reference symbols; and
    decoding the second message based at least in part on the Doppler effect compensation, the second message received during the TTI and the second message decoded in accordance with a second MCS, the second MCS being higher than the first MCS.

12. The method of claim 11, wherein the first message comprises indications of the first location, the first heading, and the first speed of a transmitter of the first message and the second message.

13. The method of claim 12, further comprising:
    identifying a second location, a second heading, and a second speed of the wireless device; and
    estimating a Doppler effect associated with the second message based at least in part on the first location, the first heading, the first speed, the second location, the second heading, and the second speed.

14. The method of claim 13, wherein the first message comprises an indication of first beamforming vectors of the transmitter, the method further comprising:
identifying second beamforming vectors of the wireless device; and
estimating the Doppler effect associated with the second message based at least in part on the first beamforming vectors and the second beamforming vectors.

15. The method of claim 11, further comprising:
identifying first beamforming vectors of a transmitter of the first message and the second message, and second beamforming vectors of the wireless device; and
tracking an association of angles of departure (AODs) of the first beamforming vectors and angles of arrival (AOAs) of the second beamforming vectors,
wherein performing the Doppler effect compensation comprises compensating for a Doppler effect in at least one non-line-of-sight (NLOS) path between the transmitter and the wireless device based at least in part on the tracking.

16. The method of claim 11, further comprising:
identifying, based at least in part on a sensor reading, an existence of a line-of-sight (LOS) path between a transmitter of the first message and the second message and the wireless device,
wherein performing the Doppler effect compensation comprises compensating for a Doppler effect in the LOS path.

17. The method of claim 11, further comprising:
transmitting a non-acknowledgement message prior to the first message; and
receiving the first message in response to transmitting the non-acknowledgement message.

18. An apparatus for wireless communication at a wireless device, comprising:
means for decoding, in accordance with a first modulation and coding scheme (MCS), a first message comprising a control transmission received during a transmission time interval (TTI) and based at least in part on a Doppler effect condition satisfying a Doppler effect condition threshold, the first message comprising indications of a first location, a first heading, and a first speed of the wireless device;
means for performing a Doppler effect compensation for a second message comprising a data transmission based at least in part on the first message, wherein the first message is associated with a first density of resource element (RE) carrying reference symbols, the first message comprising an indication of a second density of RE carrying reference symbols of the second message, and the second density of RE carrying reference symbols is greater than the first density of RE carrying reference symbols; and
means for decoding the second message based at least in part on the Doppler effect compensation, the second message received during the TTI and the second message decoded in accordance with a second MCS, the second MCS being higher than the first MCS.

19. The apparatus of claim 18, wherein the first message comprises indications of the first location, the first heading, and the first speed of a transmitter of the first message and the second message.

20. The apparatus of claim 19, further comprising:
means for identifying a second location, a second heading, and a second speed of the wireless device; and
means for estimating a Doppler effect associated with the second message based at least in part on the first location, the first heading, the first speed, the second location, the second heading, and the second speed.

21. The apparatus of claim 20, wherein the first message comprises an indication of first beamforming vectors of the transmitter, the apparatus further comprising:
means for identifying second beamforming vectors of the wireless device; and
means for estimating the Doppler effect associated with the second message based at least in part on the first beamforming vectors and the second beamforming vectors.

22. The apparatus of claim 18, further comprising:
means for identifying first beamforming vectors of a transmitter of the first message and the second message, and second beamforming vectors of the wireless device; and
means for tracking an association of angles of departure (AODs) of the first beamforming vectors and angles of arrival (AOAs) of the second beamforming vectors,
wherein the means for performing the Doppler effect compensation comprises means for compensating for a Doppler effect in at least one non-line-of-sight (NLOS) path between the transmitter and the wireless device based at least in part on the tracking.

23. The apparatus of claim 18, further comprising:
means for identifying, based at least in part on a sensor reading, an existence of a line-of-sight (LOS) path between a transmitter of the first message and the second message and the wireless device,
wherein the means for performing the Doppler effect compensation comprises means for compensating for a Doppler effect in the LOS path.

24. The apparatus of claim 18, further comprising:
means for transmitting a non-acknowledgement message prior to the first message; and
means for receiving the first message in response to transmitting the non-acknowledgement message.

* * * * *